US012277914B2

(12) United States Patent
Tominaga

(10) Patent No.: US 12,277,914 B2
(45) Date of Patent: Apr. 15, 2025

(54) LIQUID CRYSTAL DISPLAY DEVICE HAVING TWO DISPLAY REGIONS ARRANGED SIDE BY SIDE IN A HORIZONTAL DIRECTION

(71) Applicant: Sharp Display Technology Corporation, Kameyama (JP)

(72) Inventor: Masakatsu Tominaga, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/406,439

(22) Filed: Jan. 8, 2024

(65) Prior Publication Data

US 2024/0290293 A1 Aug. 29, 2024

(30) Foreign Application Priority Data

Feb. 28, 2023 (JP) ................................ 2023-029439

(51) Int. Cl.
*G09G 3/36* (2006.01)

(52) U.S. Cl.
CPC ... *G09G 3/3659* (2013.01); *G09G 2300/0426* (2013.01); *G09G 2310/0213* (2013.01); *G09G 2310/0278* (2013.01)

(58) Field of Classification Search
CPC ......... G09G 3/3659; G09G 2300/0426; G09G 2310/0213; G09G 2310/0278
See application file for complete search history.

(56) References Cited

U.S. PATENT DOCUMENTS

2013/0328840 A1 12/2013 Fujikawa
2016/0019852 A1* 1/2016 Kim .................... G09G 3/3666 345/103
2019/0339556 A1 11/2019 Yoshida
2020/0050063 A1 2/2020 Yoshida

FOREIGN PATENT DOCUMENTS

JP 2009-168834 A 7/2009
WO 2012/115052 A1 8/2012
WO 2018/131533 A1 7/2018
WO 2018128107 A1 7/2018

* cited by examiner

*Primary Examiner* — Afroza Chowdhury
(74) *Attorney, Agent, or Firm* — ScienBiziP, P.C.

(57) ABSTRACT

A liquid crystal display device includes a display region including a first and second region adjacent in a first direction, a substrate with a width of the second region in the first direction being greater than a width of the first region, a plurality of first and second gate bus lines extending in a second direction and arranged in the first and second regions, and a first and second gate driver connected to the plurality of first and second gate bus lines, respectively. A first scanning period in which the first gate driver scans the first gate bus lines overlaps a part of a second scanning period in which the second gate driver scans the second gate bus lines.

25 Claims, 35 Drawing Sheets

LIQUID CRYSTAL DISPLAY DEVICE HAVING TWO DISPLAY REGIONS ARRANGED SIDE BY SIDE IN A HORIZONTAL DIRECTION

CROSS-REFERENCE TO RELATED APPLICATIONS

This application claims the benefit of priority to Japanese Patent Application Number 2023-029439 filed on Feb. 28, 2023. The entire contents of the above-identified application are hereby incorporated by reference.

BACKGROUND

Technical Field

The disclosure relates to a liquid crystal display device.

A liquid crystal display device has been proposed in which two display regions are connected side by side in a horizontal direction. For example, WO 2018/128107 discloses a liquid crystal display device having a curved axis in a vertical direction and two connected display regions curved in a horizontal direction.

SUMMARY

An object of the disclosure is to provide a liquid crystal display device with excellent display quality that includes a horizontally-long display region in which two such display regions are arranged side by side in a horizontal direction.

A liquid crystal display device according to an embodiment of the disclosure includes: a substrate including a display region including a first region and a second region adjacent to one another in a first direction and a main surface including a non-display region located outside of the display region, a width of the second region in the first direction being greater than a width of the first region; a plurality of first gate bus lines each extending in a second direction perpendicular to the first direction and arrayed in the first direction in the first region; a plurality of second gate bus lines each extending in the second direction and arrayed in the first direction in the second region, the number of the plurality of second gate bus lines being more than the number of the plurality of first gate bus lines; a plurality of first source bus lines each extending in the first direction and arrayed in the second direction in the first region; a plurality of second source bus lines each extending in the first direction and arrayed in the second direction in the second region; and a first gate driver and a second gate driver, both of which are disposed in the non-display region, wherein the plurality of first gate bus lines are connected to the first gate driver, the plurality of second gate bus lines are connected to the second gate driver, a period in which the first gate driver scans the plurality of first gate bus lines from a first gate bus line farthest from a boundary between the first region and the second region toward a first gate bus line closest to the boundary from among the plurality of first gate bus lines or a period in which the first gate driver scans the plurality of first gate bus lines from the first gate bus line closest to the boundary between the first region and the second region toward the first gate bus line farthest from the boundary from among the plurality of first gate bus lines is defined as a first scanning period, a period in which the second gate driver scans the plurality of second gate bus lines from a second gate bus line farthest from the boundary between the first region and the second region toward a second gate bus line closest to the boundary from among the plurality of second gate bus lines or a period in which the second gate driver scans the plurality of second gate bus lines from the second gate bus line closest to the boundary between the first region and the second region toward the second gate bus line farthest from the boundary from among the plurality of second gate bus lines is defined as a second scanning period, and the first gate driver sequentially outputs a scanning signal to the plurality of first gate bus lines in the first scanning period, the second gate driver sequentially outputs a scanning signal to the plurality of second gate bus lines in the second scanning period, and substantially all of the first scanning period overlaps a part of the second scanning period.

According to an embodiment of the disclosure, provided is a liquid crystal display device with excellent display quality that includes a horizontally-long display region in which two such display regions are arranged side by side in a horizontal direction.

BRIEF DESCRIPTION OF DRAWINGS

The disclosure will be described with reference to the accompanying drawings, wherein like numbers reference like elements.

DESCRIPTION OF EMBODIMENTS

Figure 1:
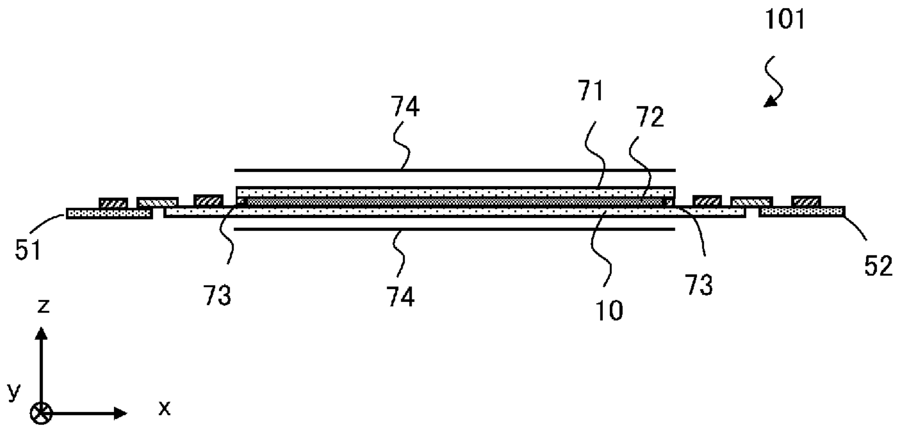
FIG. 1 is a schematic cross-sectional view illustrating a configuration example of a display device according to a first embodiment.

Liquid crystal display devices are used in various fields, and there is a demand for them to accommodate modes of use that are not known. For example, in the case of a liquid crystal display device installed in an automobile, it is conceivable that, by integrally forming a liquid crystal display device that is for displaying various types of gauges and is positioned at the front of the driver seat and a liquid crystal display device for a center information display disposed between the driver seat and the passenger seat, excellent interior design can be provided and an excellent display effect can be achieved. The disclosure has been made in light of such a problem and realizes a novel liquid crystal display device.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

FIG. 1 is a schematic cross-sectional view illustrating a configuration example of a liquid crystal display device according to the present embodiment. A liquid crystal display device 101 includes an active matrix substrate 10, a counter substrate 71, and a liquid crystal layer 72.

The liquid crystal layer 72 is located between the active matrix substrate 10 and the counter substrate 71 and is sealed between the active matrix substrate 10 and the counter substrate 71 by a seal 73.

Figure 2:
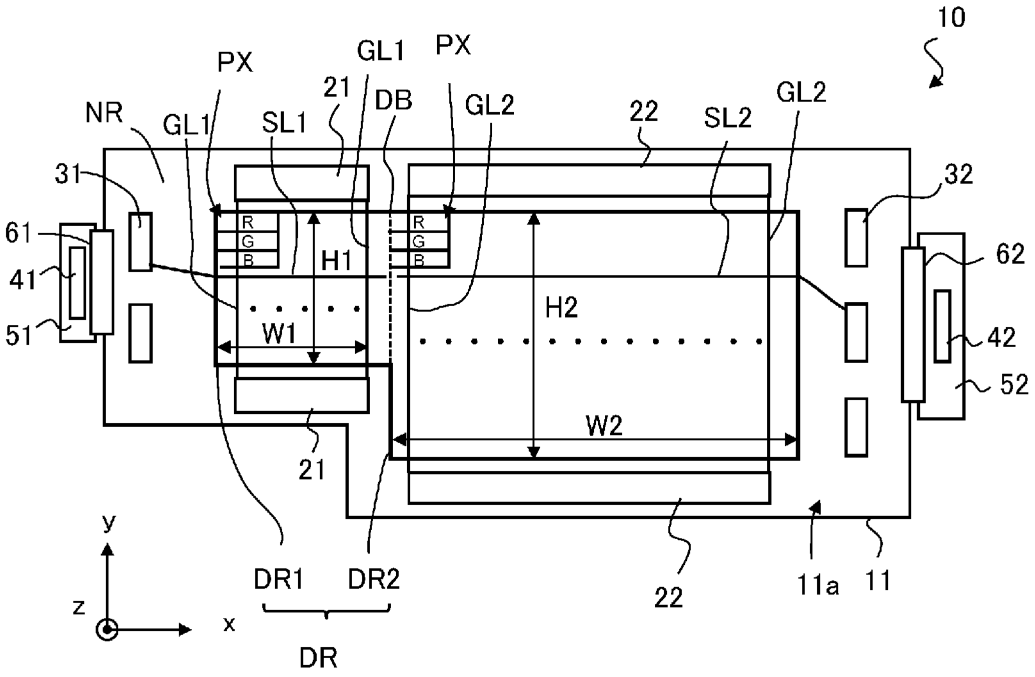
FIG. 2 is a schematic view illustrating a configuration example of an active matrix substrate.

FIG. 2 is a schematic view illustrating a configuration example of the active matrix substrate 10. The active matrix substrate 10 includes a substrate 11 with a main surface 11*a*. The main surface 11*a* includes a first region DR1 and a second region DR2. The first region DR1 and the second region DR2 are disposed adjacent to one another in the x-axis direction, which is a first direction, and a boundary DB is located between the first region DR1 and the second region DR2. Also, the first region DR1 and the second region DR2 are continuous and form an integrated display region DR that can perform seamless image display.

In the present embodiment, the first region DR1 and the second region DR2 each have a rectangular shape. A width W2 of the second region DR2 in the x-axis direction is greater than a width W1 of the first region DR1. Also, in the present embodiment, a height H2 of the second region DR2 is greater than a height H1 of the first region DR1 in the y-axis direction, which is a second direction perpendicular to the first direction. However, the height H1 may be equal to the height H2, or the height H1 may be greater than the height H2.

In the present embodiment, although the second region DR2 is located on the right side of the first region DR1, the second region DR2 may be located on the left side of the first region DR1. In a case where the liquid crystal display device 101 is installed in the vehicle, a speedometer or the like is displayed in the second region DR2, and the first region DR1 is used for a center information display, the arrangement of the first region DR1 and the second region DR2 illustrated in FIG. 2 is suitable for a right-hand drive vehicle, for example. In a case where the second region DR2 is located on the left side of the first region DR1, the liquid crystal display device 101 is suitable for a left-hand drive vehicle. Alternatively, a speedometer or the like may be displayed in the first region DR1, and the second region DR2 may be used as a center information display. In this case, the arrangement of the first region DR1 and the second region DR2 illustrated in FIG. 2 is suitable for a left-hand drive vehicle, for example.

The main surface 11*a* further includes a non-display region NR located outside the display region DR and surrounding the display region DR. In FIG. 2 and the like, the non-display region NR is exaggerated in size for ease of understanding. Further, in the mode illustrated in FIG. 2, the substrate 11 has a shape in which a cut-away portion is provided at one of four corners of a rectangle in correspondence with the height H1 being less than the height H2. However, the substrate 11 may have a rectangular shape without a cut-away portion.

The substrate 11 may be flat or may have a curved shape. To be specific, the substrate 11 may be curved such that the main surface 11*a* is recessed. In this case, the axis of curvature is preferably parallel with the y-axis.

The active matrix substrate 10 further includes a plurality of first gate bus lines GL1, a plurality of second gate bus lines GL2, a plurality of first source bus lines SL1, and a plurality of second source bus lines SL2.

The plurality of first gate bus lines GL1 each extend in the y-axis direction and are arrayed in the x-axis direction in the first region DR1. In a similar manner, the plurality of second gate bus lines GL2 each extend in the y-axis direction and are arrayed in the x-axis direction in the second region DR2. Both ends of the first gate bus lines GL1 and the second gate bus lines GL2 extend to the non-display region NR. Here, the number of the second gate bus lines GL2 is greater than the number of the first gate bus lines GL1. In the present embodiment, for example, the number of the first gate bus lines GL1 is 1920, and the number of the second gate bus lines GL2 is 3840.

The plurality of first source bus lines SL1 each extend in the x-axis direction and are arrayed in the y-axis direction in the first region DR1. In a similar manner, the plurality of second source bus lines SL2 each extend in the x-axis direction and are arrayed in the y-axis direction in the second region DR2. One end farther from the boundary DB of each of the first source bus lines SL1 and the second source bus lines SL2 extends to the non-display region NR. The first source bus lines SL1 and the second source bus lines SL2 are not connected to one another on the active matrix substrate 10 and are independently controlled.

Figure 3:
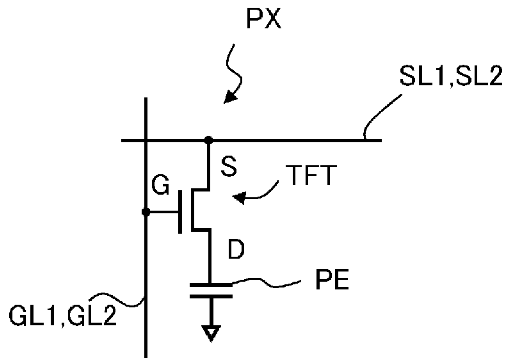
FIG. 3 is a view illustrating an example of a circuit configuration of a pixel.

The active matrix substrate 10 further includes a plurality of pixels PX. Each pixel PX is mainly arranged in a region surrounded by a pair of adjacent first gate bus lines GL1 and a pair of adjacent first source bus lines SL1 and a region surrounded by a pair of adjacent second gate bus lines GL2 and a pair of adjacent second source bus lines SL2. FIG. 3 illustrates an example of the circuit configuration of the pixel PX. The pixel PX includes a TFT, which is an example of a switching element, and a pixel electrode PE. At the TFT of each pixel PX, a gate electrode G is connected to the first gate bus line GL1 or the second gate bus line GL2, and a source electrode S is connected to the first source bus line SL1 or the second source bus line SL2. The pixel electrode PE is connected to a drain electrode D.

The pixel PX transmits different colors such as R, G, and B via a color filter disposed at the counter substrate 71 or the active matrix substrate 10. As illustrated in FIG. 2, of the plurality of pixels PX in the first region DR1 and the second region DR2, the pixels PX arrayed in the y direction are associated with different colors.

The liquid crystal display device 101 further includes a control device. The control device includes a first gate driver 21, a second gate driver 22, a first source driver 31, a second source driver 32, a first timing controller 41, and a second timing controller 42. The first timing controller 41 and the second timing controller 42 are mounted on a first circuit substrate 51 and a second circuit substrate 52, respectively. The first circuit substrate 51 and the second circuit substrate 52 are connected to the substrate 11 via flexible printed circuits (FPCs) 61 and 62, respectively.

In the present embodiment, the control device includes a pair of the first gate drivers 21, which are arranged in the non-display region NR so as to sandwich the first region DR1 in the y-axis direction. Both ends of the first gate bus lines GL1 are connected to the pair of first gate drivers 21, respectively.

In a similar manner, the control device includes a pair of the second gate drivers 22, which are arranged in the non-display region NR so as to sandwich the second region DR2 in the y-axis direction. Both ends of the second gate bus lines GL2 are connected to the pair of second gate drivers 22, respectively.

Each of the first gate driver 21 and the second gate driver 22 is a so-called shift register circuit and includes a plurality of unit circuits arrayed in the x-axis direction. The plurality of first gate bus lines GL1 are each connected to the unit circuit of the first gate driver 21. In a similar manner, the plurality of second gate bus lines GL2 are each connected to the unit circuit of the second gate driver 22.

The first gate bus lines GL1 and the second gate bus lines GL2 are input with the same scanning signal from both ends of each bus line and driven. However, the control device may include one first gate driver 21 and one second gate driver 22, and a scanning signal may be input from one end of the first gate bus line GL1 and the second gate bus line GL2.

The first gate driver 21 and the second gate driver 22 may be integrally (monolithically) formed on the substrate 11. For example, each of the first gate driver 21 and the second gate driver 22 may include a plurality of TFTs, and these TFTs and the TFTs of the pixels PX may be formed simultaneously. Such a gate driver is also referred to as a gate-on-array (GOA). In the case of a GOA, the gate driver is formed in a region where the counter substrate 71 and a light blocking member (black matrix) formed on the counter substrate 71 are disposed. Alternatively, the first gate driver 21 and the second gate driver 22 may be configured by a bare chip or a packaged chip and may be mounted in the non-display region NR of the substrate 11. In this case, the gate driver is mounted in a region where the counter substrate 71 is not disposed.

Since the GOA has a thin film structure, it can follow the curvature of the substrate 11 to some extent. Thus, in a case where the substrate 11 is curved, the first gate driver 21 and the second gate driver 22 are preferably GOAs.

The first source driver 31 and the second source driver 32 are disposed in the non-display region NR so as to sandwich the display region DR in the x-axis direction. The first source driver 31 and the second source driver 32 are configured by a bare chip or a packaged chip and are mounted in a region of the substrate 11 where the counter substrate 71 is not disposed.

In a case where the substrate 11 is curved, the direction of curvature is parallel with the x-axis. On the other hand, in the non-display region NR, the region where the first source driver 31 and the second source driver 32 are disposed extends in the y-axis direction orthogonal to the direction of curvature. Thus, the effects of the curvature are suppressed, and the first source driver 31, the second source driver 32, solder at the time of mounting, and the like can be suppressed from receiving stress due to the curvature.

The first timing controller 41 is mounted on the first circuit substrate 51, and the first circuit substrate 51 is connected to one end of the substrate 11 via the FPC 61, whereby the first timing controller 41 is electrically connected to the first gate driver 21 and the first source driver 31. In a similar manner, the second timing controller 42 is mounted on the second circuit substrate 52, and the second circuit substrate 52 is connected to the other end of the substrate 11 via the FPC 62, whereby the second timing controller 42 is electrically connected to the second gate driver 22 and the second source driver 32.

The control device receives a video signal from a host computer in which the liquid crystal display device 101 is installed. The first timing controller 41 outputs a gate control signal to the first gate driver 21 for an image to be displayed in the first region DR1 from the video signal. The first gate driver 21 generates a scanning signal and scans the first gate bus lines GL1. The first timing controller 41 outputs a display data signal to the first source driver 31. The first source driver 31 generates an image signal and outputs the image signal to the first source bus lines SL1.

In a similar manner, the second timing controller 42 outputs a gate control signal to the second gate driver 22 for an image to be displayed in the second region DR2 from the video signal. The second gate driver 22 generates a scanning signal and scans the second gate bus lines GL2. The second timing controller 42 outputs a display data signal to the second source driver 32. The second source driver 32 generates an image signal and outputs the image signal to the second source bus lines SL2.

The video signal received from the host computer includes information of an image to be displayed in the first region DR1 and information of an image to be displayed in the second region DR2. The first timing controller 41 and the second timing controller 42 generate a gate control signal for an image to be displayed in the first region DR1 and a gate control signal for an image to be displayed in the second region DR2 from the same video signal, respectively. Thus, these two gate control signals are in sync.

In the liquid crystal display device 101 of the present embodiment, the image displayed in the first region DR1 and the image displayed in the second region DR2 are independently controlled by the first timing controller 41 and the second timing controller 42. Hereinafter, scanning of the first gate bus lines GL1 and the second gate bus lines GL2 for displaying an image will be described.

Figure 4:
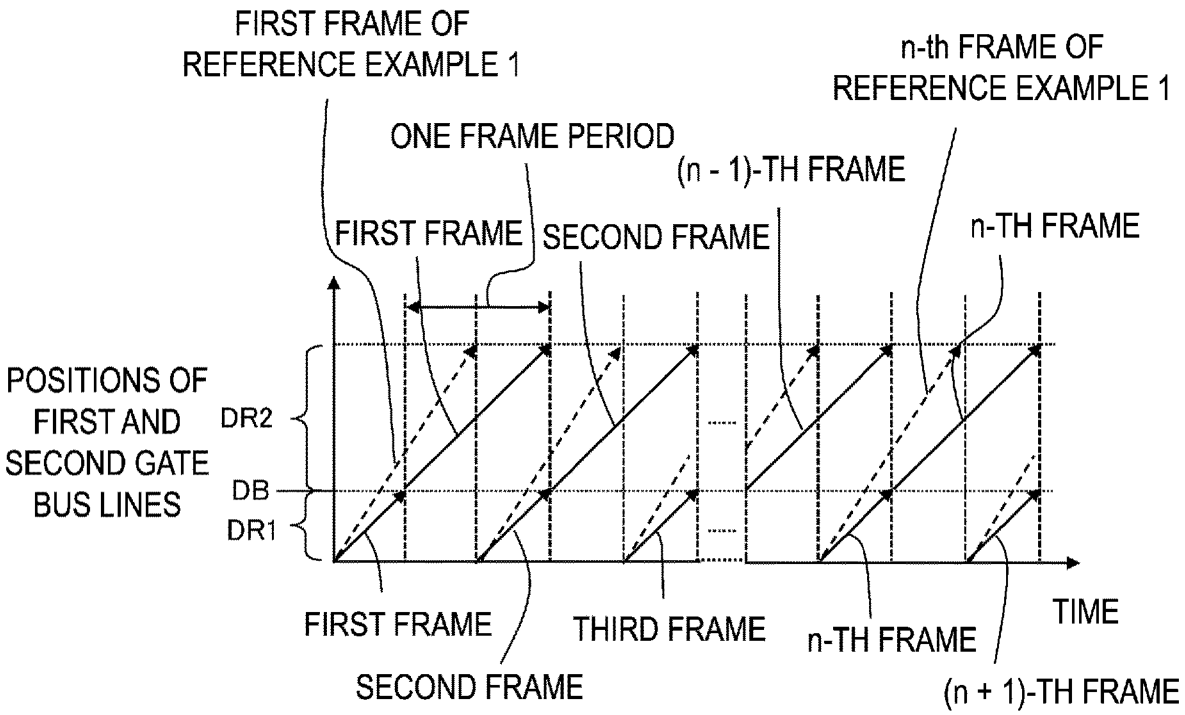
FIG. 4 is a schematic graph for describing the timing of scanning first gate bus lines and second gate bus lines according to a liquid crystal display device of the first embodiment.

FIG. 4 is a schematic graph for describing the timing of scanning the first gate bus lines GL1 and the second gate bus lines GL2. The horizontal axis represents time, and the vertical axis represents the positions of the first gate bus lines GL1 and the second gate bus lines GL2. FIGS. 5 to 9 are schematic views illustrating scanning of the first gate bus lines GL1 and the second gate bus lines GL2 at certain timing according to the liquid crystal display device of the present embodiment. In FIGS. 5 to 9, the first gate bus lines GL1 and the second gate bus lines GL2 are indicated by dashed lines except for the gate bus line being driven. That is, a gate bus line to which a signal for turning on the TFT of each pixel PX is input is indicated by a solid line, and a gate bus line to which a signal for turning off the TFT of each pixel PX is input is indicated by a dashed line. The arrow indicates the scanning direction. FIG. 4 also illustrates an example of the timing at which the gate bus lines are scanned in Reference Example 1 described later.

Figure 5:
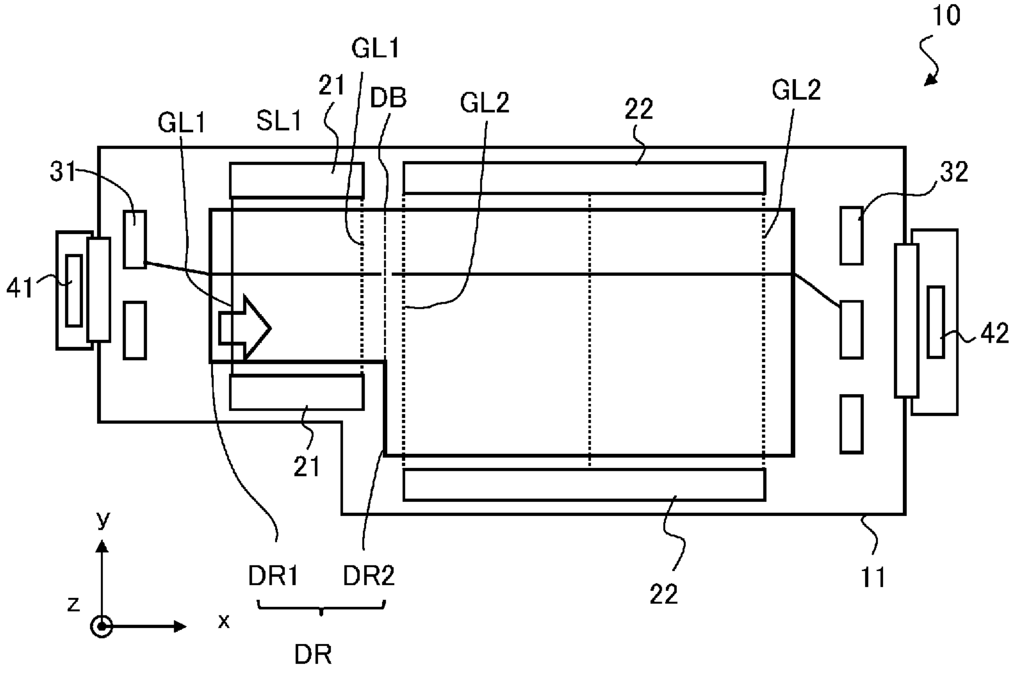
FIG. 5 is a schematic view for describing scanning of the first gate bus lines and the second gate bus lines according to the liquid crystal display device of the first embodiment.

First, a first frame of an image is displayed in the first region DR1 of the display region DR. As illustrated in FIG. 5, the plurality of first gate bus lines GL1 are sequentially scanned in a direction from the first gate bus line GL1 farthest from the boundary DB toward the first gate bus line GL1 closest to the boundary DB from among the plurality of first gate bus lines GL1. A first scanning period is started by scanning the first gate bus line GL1 farthest from the boundary DB.

Figure 6:
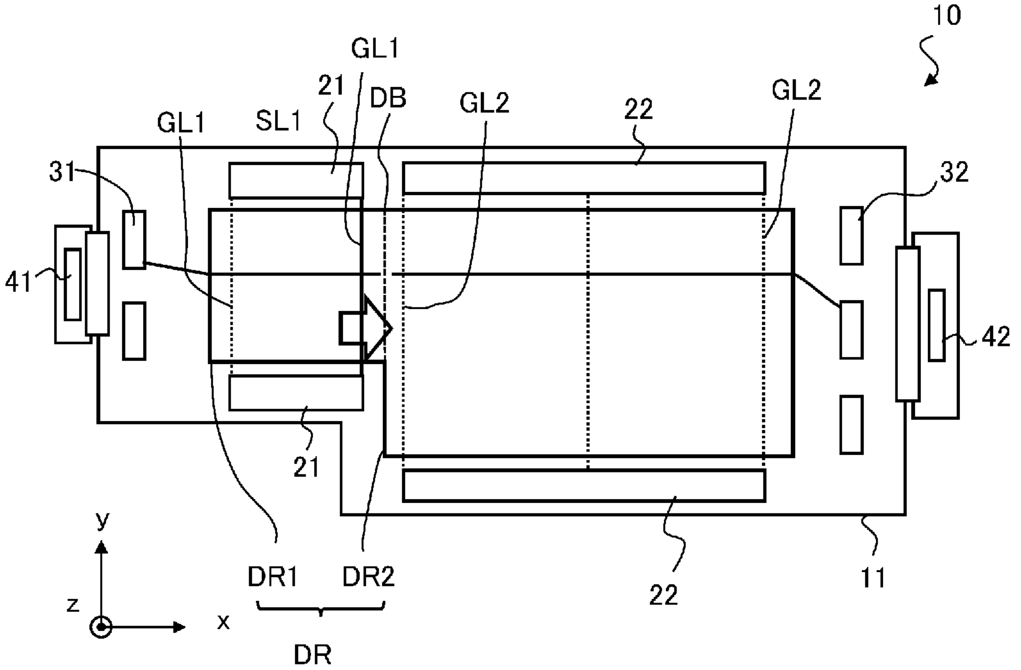
FIG. 6 is a schematic view for describing scanning of the first gate bus lines and the second gate bus lines according to the liquid crystal display device of the first embodiment.

When each one of the plurality of first gate bus lines GL1 are being sequentially scanned toward the boundary DB and, as illustrated in FIG. 6, the scanning of the first gate bus line GL1 closest to the boundary DB is complete, the first scanning period ends.

Figure 7:
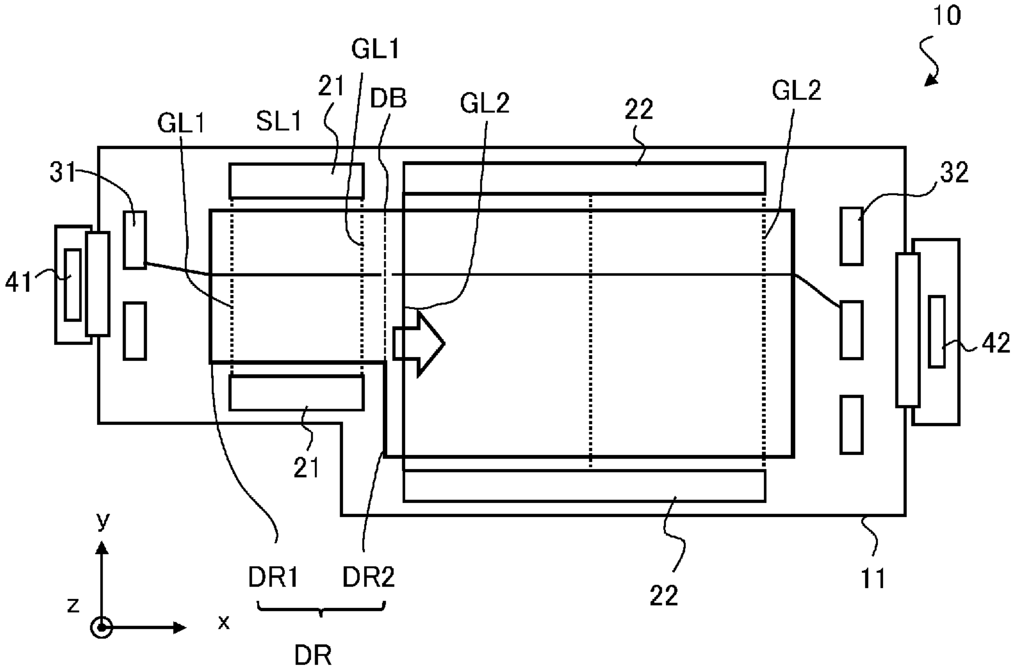
FIG. 7 is a schematic view for describing scanning of the first gate bus lines and the second gate bus lines according to the liquid crystal display device of the first embodiment.

Subsequently, the first frame of the image is displayed in the second region DR2 of the display region DR. As illustrated in FIG. 7, the plurality of second gate bus lines GL2 are sequentially scanned in a direction from the second gate bus line GL2 closest to the boundary DB toward the second gate bus line GL2 farthest from the boundary DB from among the plurality of second gate bus lines GL2. A second scanning period is started by scanning the second gate bus line GL2 closest to the boundary DB.

Figure 8:
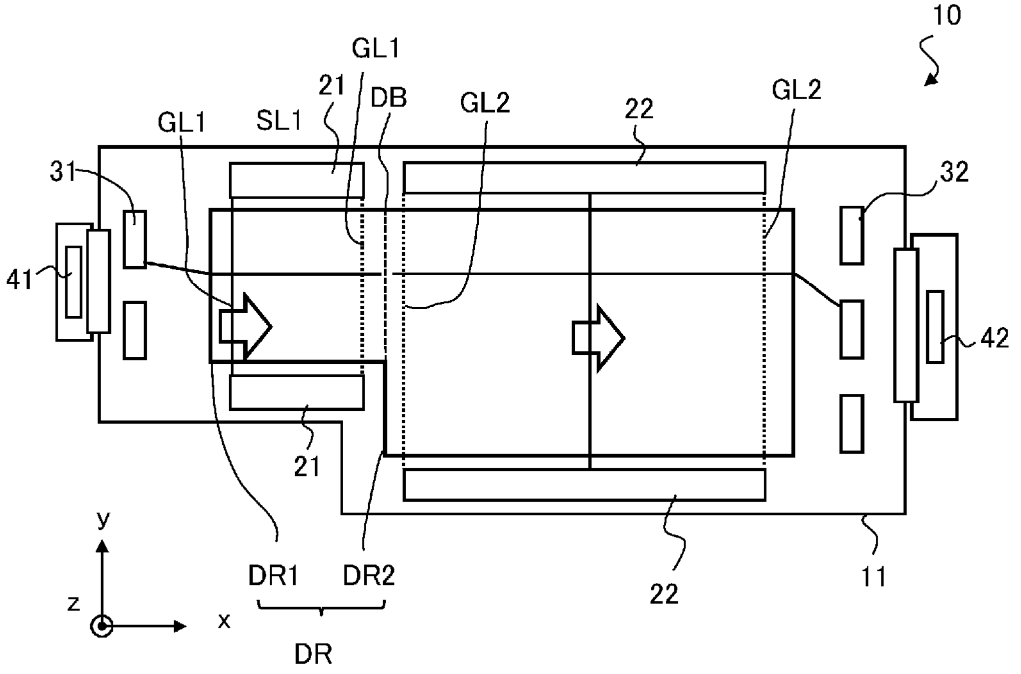
FIG. 8 is a schematic view for describing scanning of the first gate bus lines and the second gate bus lines according to the liquid crystal display device of the first embodiment.

As illustrated in FIG. 8, a second frame of the image is displayed in the first region DR1 at the timing when the second gate bus line GL2, of the plurality of second gate bus lines GL2, between the second gate bus line GL2 closest to the boundary DB and the second gate bus line GL2 farthest from the boundary DB is being scanned. A first scanning period is started by scanning the first gate bus line GL1 farthest from the boundary DB from among the plurality of first gate bus lines GL1.

Thereafter, the first gate bus lines GL1 and the second gate bus lines GL2 are simultaneously scanned. That is, the first scanning period and the second scanning period overlap one another.

Figure 9:
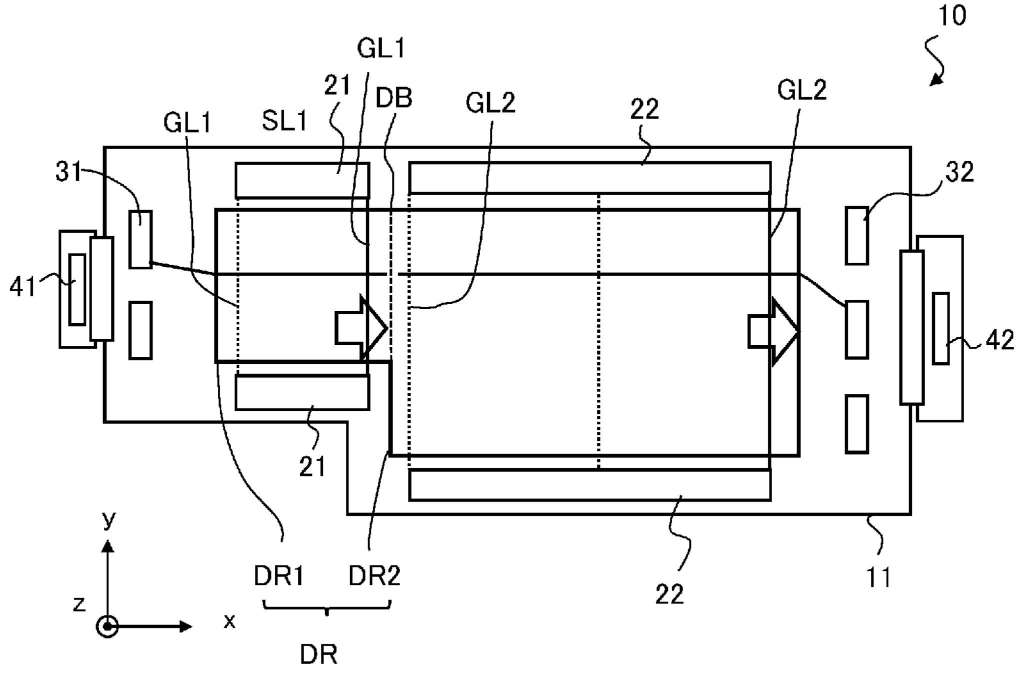
FIG. 9 is a schematic view for describing scanning of the first gate bus lines and the second gate bus lines according to the liquid crystal display device of the first embodiment.

As illustrated in FIG. 9, in the second region DR2, at the timing when the scanning of the second gate bus line GL2 farthest from the boundary DB is completed, in the first region DR1, the scanning of the first gate bus line GL1 closest to the boundary DB is also completed. Thus, the first scanning period of the second frame and the second scanning period of the first frame end.

Subsequently, the second frame of the image is displayed in the second region DR2 of the display region DR. As illustrated in FIG. 7, the plurality of second gate bus lines GL2 are sequentially scanned in a direction from the second gate bus line GL2 closest to the boundary DB toward the second gate bus line GL2 farthest from the boundary DB from among the plurality of second gate bus lines GL2. A second scanning period is started by scanning the second gate bus line GL2 closest to the boundary DB.

Thereafter, as illustrated in FIG. 8, in order to display a third frame of the image in the first region DR1, the first gate bus line GL1 farthest from the boundary DB after the start period of the second scanning period is scanned, and the first scanning period is started. Also, as illustrated in FIG. 9, in the second region DR2, at the timing when the scanning of the second gate bus line GL2 farthest from the boundary DB is completed, in the first region DR1, the scanning of the first gate bus line GL1 closest to the boundary DB is also completed. Thus, the first scanning period of the third frame and the second scanning period of the second frame end. Thereafter, the scanning illustrated in FIGS. 7 to 9 is repeated.

As described above, the first gate bus lines GL1 and the second gate bus lines GL2 are scanned so that the first scanning period of the n-th frame in the first region DR1 overlaps with a part of the second scanning period of the (n−1)-th frame in the second region DR2, where n is any natural number. Thus, after the start of the second scanning period of the (n−1)-th frame in the second region DR2, the first scanning period of the n-th frame in the first region DR1 is started. Immediately after the end of the first scanning period of the n-th frame in the first region DR1, the second scanning period of the n-th frame in the second region DR2 is started.

The timing of the end of the first scanning period of the n-th frame and the timing of the end of the second scanning period of the (n−1)-th frame may completely coincide with one another or may be offset from one another by an amount equal to or less than the amount of time taken to scan one line to five lines or the gate bus lines whose number is corresponding to 5% of the number of the first gate bus lines GL1, for example. Further, the first scanning period may end during a period in which a signal for turning on the TFT of each pixel PX is being input to the second gate bus line GL2 farthest from the boundary DB, or the second scanning period may end during a period in which a signal for turning on the TFT of each pixel PX is being input to the first gate bus line GL1 closest to the boundary DB. In other words, the entire period of the first scanning period or substantially the entire period obtained by subtracting the scanning period for five lines from the first scanning period, for example, overlaps with a part of the second scanning period.

In the specification of the present application, the end of the first scanning period and the end of the second scanning period being simultaneous means that the end timing of the first scanning period and the end timing of the second scanning period are within a range of equal to or less than 5 times the amount of time to scan one gate bus line or equal to or less than the amount of time taken to scan the gate bus lines whose number is corresponding to 5% of the number of the first gate bus lines GL1.

To paraphrase using the start timing, when the number of the first gate bus lines GL1 is $m_1$ and the number of the second gate bus lines GL2 is $m_2$ ($m_2>m_1$), a signal for turning on the TFT of the pixel PX is input to the ($m_2-m_1+1$)-th second gate bus line GL2 from the side closest to the boundary DB and at the same time a signal for turning on the TFT of the pixel PX is input to the first gate bus line GL1 farthest from the boundary DB. Thus, the end timing of the first scanning period of the n-th frame and the end timing of the second scanning period of the (n−1)-th frame completely coincide with one another. Also, in the case where a signal for turning on the TFT of the pixel PX is input to the ($m_2-m_1+1\pm L$)-th ($L=5$ or $L=m_1\times0.05$) second gate bus line GL2 from the side closest to the boundary DB and at the same time a signal for turning on the TFT of the pixel PX is input to the first gate bus line GL1 farthest from the boundary DB, the end timing of the first scanning period and the end timing of the second scanning period are included in the simultaneous category according to the definition described above. The phrase "immediately after the end of the first scanning period, the second scanning period is started" includes before and after the scanning time for one line to five lines or before and after the time taken to scan the gate bus lines whose number is corresponding to 5% of the number of the first gate bus lines GL1.

That is, the second scanning period may start earlier than the end timing of the first scanning period by an amount of time corresponding to the scanning time for one line to five lines or the time taken to scan the gate bus lines whose number is corresponding to 5% of the number of first gate bus lines GL1. Alternatively, the second scanning period may be started immediately after the end of the first scanning period, after the elapse of a scanning time for one line to five lines or after the elapse of an amount of time taken to scan the gate bus lines whose number is corresponding to 5% of the number of the first gate bus lines GL1, or the second scanning period may be started at the end of the first scanning period.

According to the present embodiment, a part of the second scanning period overlaps with the first scanning period. That is, since the first gate bus lines GL1 are scanned in a period during which the second gate bus lines GL2 are being scanned, an image for one frame can be displayed in the first region and the second region in the second scanning period.

On the other hand, consider a case where the first gate bus lines GL1 and the second gate bus lines GL2 are sequentially scanned together. For example, FIGS. 10 to 13 are schematic views illustrating such scanning (referred to as Reference Example 1).

Figure 10:
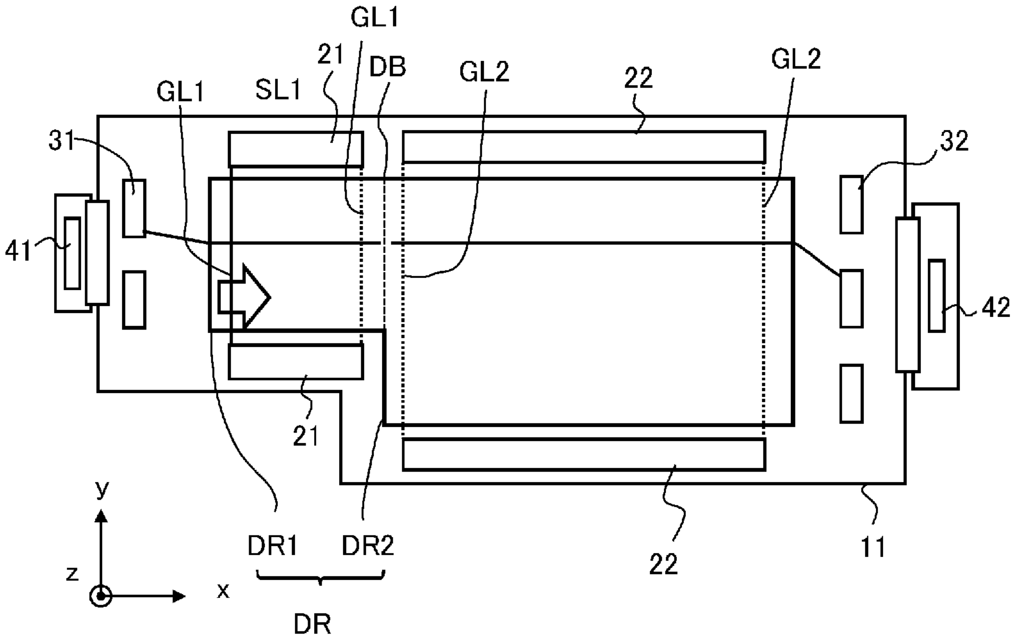
FIG. 10 is a schematic view for describing scanning of the first gate bus lines and the second gate bus lines according to the liquid crystal display device of Reference Example 1.
Figure 11:
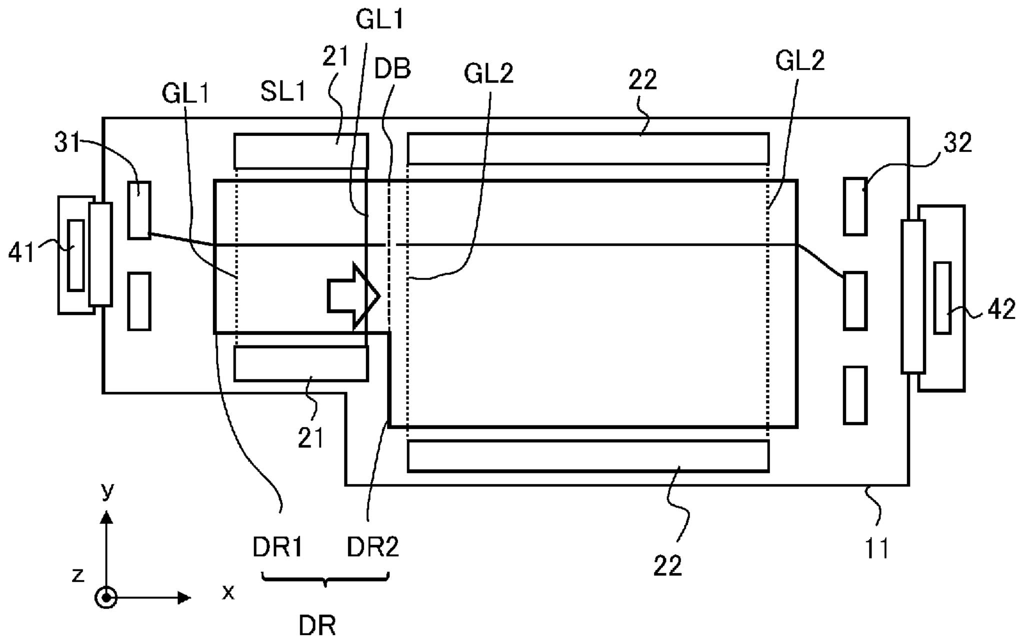
FIG. 11 is a schematic view for describing scanning of the first gate bus lines and the second gate bus lines according to the liquid crystal display device of Reference Example 1.
Figure 12:
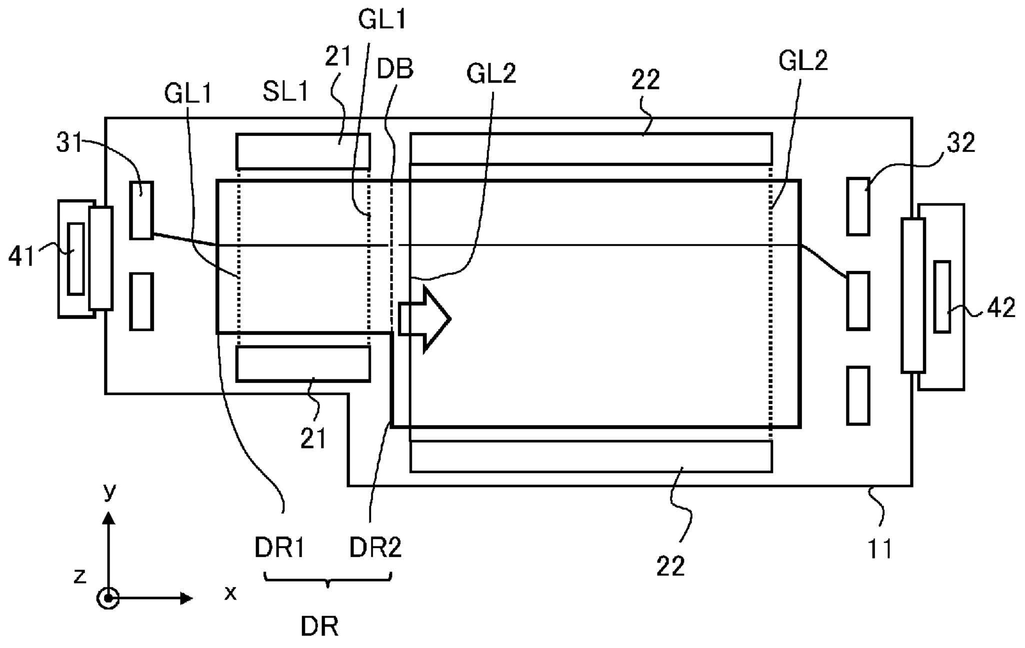
FIG. 12 is a schematic view for describing scanning of the first gate bus lines and the second gate bus lines according to the liquid crystal display device of Reference Example 1.
Figure 13:
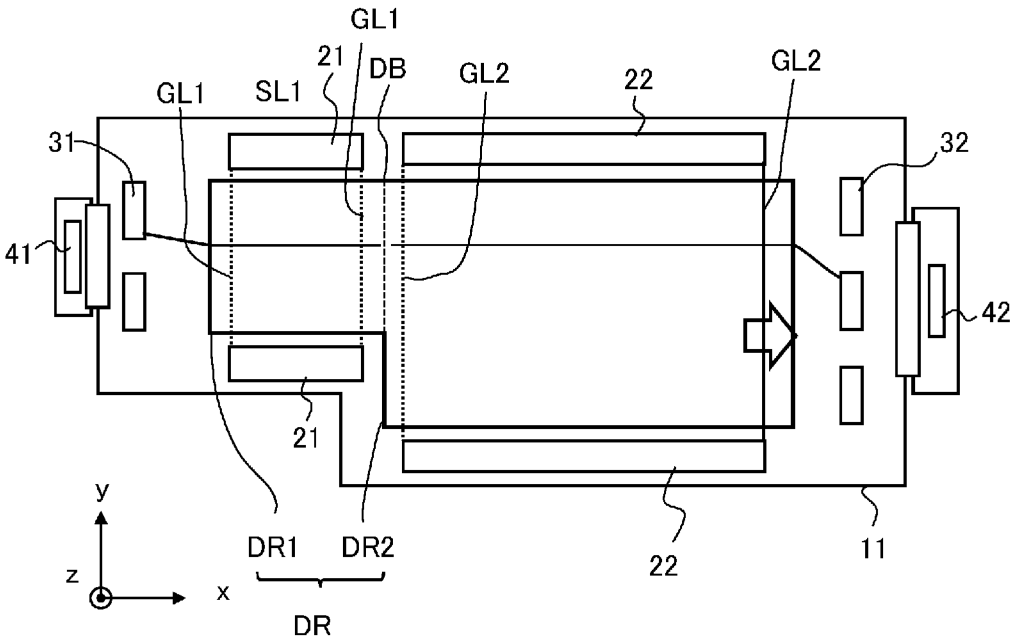
FIG. 13 is a schematic view for describing scanning of the first gate bus lines and the second gate bus lines according to the liquid crystal display device of Reference Example 1.

First, as illustrated in FIGS. 10 and 11, in the first region DR1, the plurality of first gate bus lines GL1 are scanned from the first gate bus line GL1 farthest from the boundary DB toward the first gate bus line GL1 closest to the boundary DB, and an image is displayed in the first region DR1. Subsequently, as illustrated in FIGS. 12 and 13, the plurality of second gate bus lines GL2 are scanned from the second gate bus line GL2 closest to the boundary DB toward the second gate bus line GL2 farthest from the boundary DB, and an image is displayed in the second region DR2.

In the case of this scanning according to Reference Example 1, the time required to display one frame in the first region DR1 and the second region DR2 is a period equaling the sum of the first scanning period and the second scanning period.

Since the frame rate is usually constant, in the case of Reference Example 1, it is necessary to sequentially scan all the second gate bus lines GL2 after sequentially scanning the first gate bus lines GL1 within one frame period. That is, it is necessary to scan a larger number of gate bus lines within one frame period, and the charging time of the pixels connected to each gate bus line becomes shorter. On the other hand, according to the present embodiment, in one frame period, all of the first gate bus lines GL1 are sequentially scanned while overlapping the period in which the second gate bus lines GL2 are sequentially scanned. That is, it is not necessary to separately secure a period for sequentially scanning all the first gate bus lines GL1, and it is only necessary to secure a period for scanning the gate bus lines whose number is corresponding to the number of the second gate bus lines GL2 within one frame period. In FIG. 4, the slopes of the arrows according to the disclosure are less steep than that according to Reference Example 1, and the charging time of the pixels connected to each gate bus line can be made longer. Thus, according to the liquid crystal display device of the present embodiment, each pixel can be appropriately charged without being insufficiently charged, and an image can be displayed with excellent quality. Note that one frame period is the reciprocal of the frame rate, and FIG. 4 illustrates an example of one frame period according to the first embodiment.

According to the present embodiment, the scanning of the first region DR1 ends at the first gate bus line GL1 closest to the boundary DB, and the scanning of the second region DR2 starts at the second gate bus line GL2 closest to the boundary DB. The first gate bus line GL1 and the second gate bus line GL2 adjacent to one another on both sides of the boundary DB are scanned within an amount of time corresponding to the scanning time of one line to five lines. In other words, the first region DR1 and the second region DR2 on both sides of the boundary DB are substantially continuously scanned.

Figure 14:
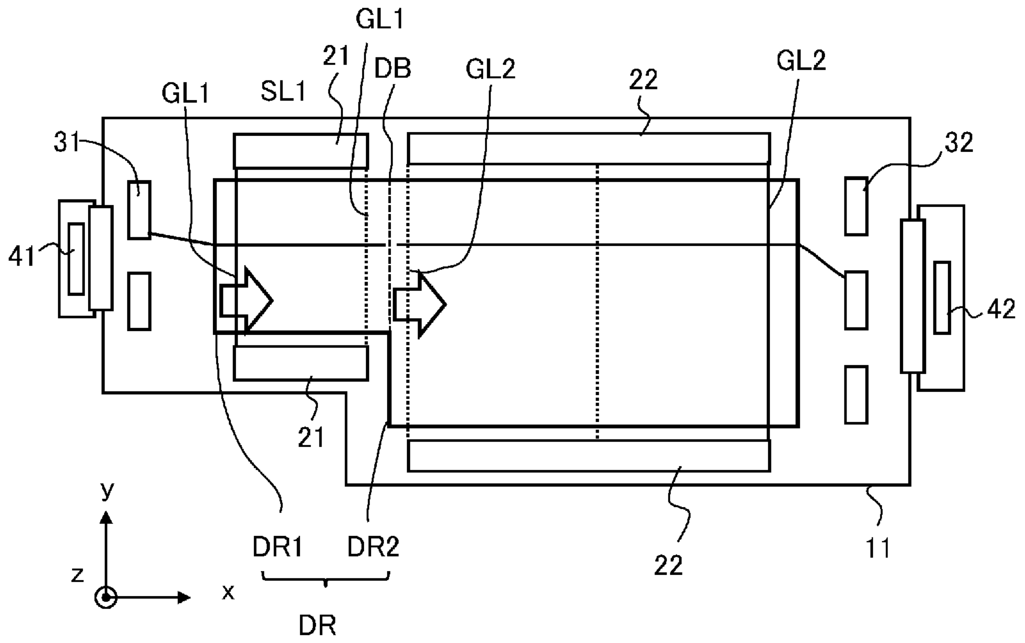
FIG. 14 is a schematic view for describing scanning of the first gate bus lines and the second gate bus lines according to the liquid crystal display device of Reference Example 2.
Figure 15:
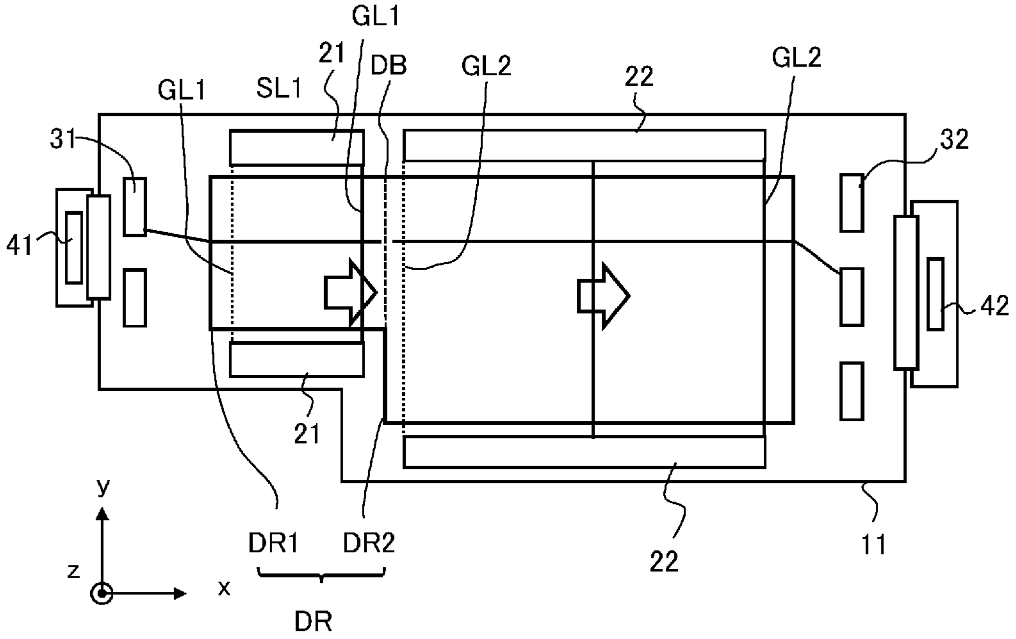
FIG. 15 is a schematic view for describing scanning of the first gate bus lines and the second gate bus lines according to the liquid crystal display device of Reference Example 2.
Figure 16:
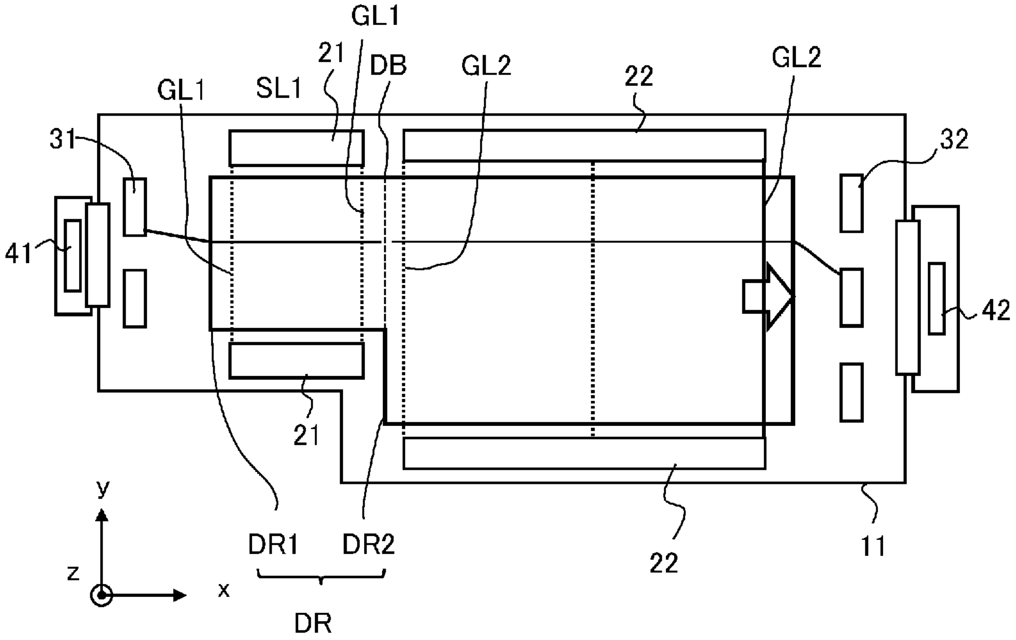
FIG. 16 is a schematic view for describing scanning of the first gate bus lines and the second gate bus lines according to the liquid crystal display device of Reference Example 2.

On the other hand, consider a case where scanning of the first gate bus lines GL1 and the second gate bus lines GL2 is started in the same direction and at the same timing. FIGS. 14 to 16 are schematic views for describing such scanning (referred to as Reference Example 2).

First, as illustrated in FIG. 14, in the first region DR1, scanning of the plurality of first gate bus lines GL1 is started from the first gate bus line GL1 farthest from the boundary DB toward the first gate bus line GL1 closest to the boundary DB. At the same time, in the second region DR2, scanning of the plurality of second gate bus lines GL2 is started from the second gate bus line GL2 closest to the boundary DB toward the second gate bus line GL2 farthest from the boundary DB. As illustrated in FIG. 15, when the scanning of the first gate bus line GL1 closest to the boundary DB is complete and the first scanning period ends, it is a point in time within the second scanning period. Thereafter, as illustrated in FIG. 16, the second scanning period ends by scanning the second gate bus line GL2 farthest from the boundary DB.

In the case of this scanning according to Reference Example 2, there is a large difference between the timing at which the first gate bus line GL1 closest to the boundary DB and the timing at which the second gate bus line GL2 closest to the boundary DB is scanned, these gate bus lines being adjacent on both sides of the boundary DB.

In a liquid crystal display device, during the display of one frame, a pixel is charged by turning on a TFT, and then the charge of the pixel is held by turning off the TFT. However, since the held charge gradually leaks, the voltage applied to the pixel gradually decreases over time. Thus, the alignment state of the liquid crystal changes with the change in voltage, and the transmitted light of the pixel to be displayed (the amount of light transmitted through the pixel) also changes.

Thus, in the case of scanning according to Reference Example 2, the display (transmitted light) at or near the boundary of the first region DR1 and the display (transmitted light) at or near the boundary of the second region DR2 are different from one another on both sides of the boundary DB, and the boundary DB becomes conspicuous.

On the other hand, according to the present embodiment, the first region DR1 and the second region DR2 are substantially continuously scanned across the boundary DB. Thus, the boundary DB between the first region DR1 and the second region DR2 is not conspicuous, and the first region DR1 and the second region DR2 are integrally displayed. Thus, with the liquid crystal display device according to the present embodiment, excellent display characteristics can be exhibited.

As long as the first gate bus lines GL1 and the second gate bus lines GL2 can be scanned as described above, the first gate driver 21 and the second gate driver 22 can be controlled by the first timing controller 41 and the second timing controller 42 via various types of connections. An example of a connection between the first timing controller 41 and the second timing controller 42 and the first gate driver 21 and the second gate driver 22 will be described below.

Figure 17:
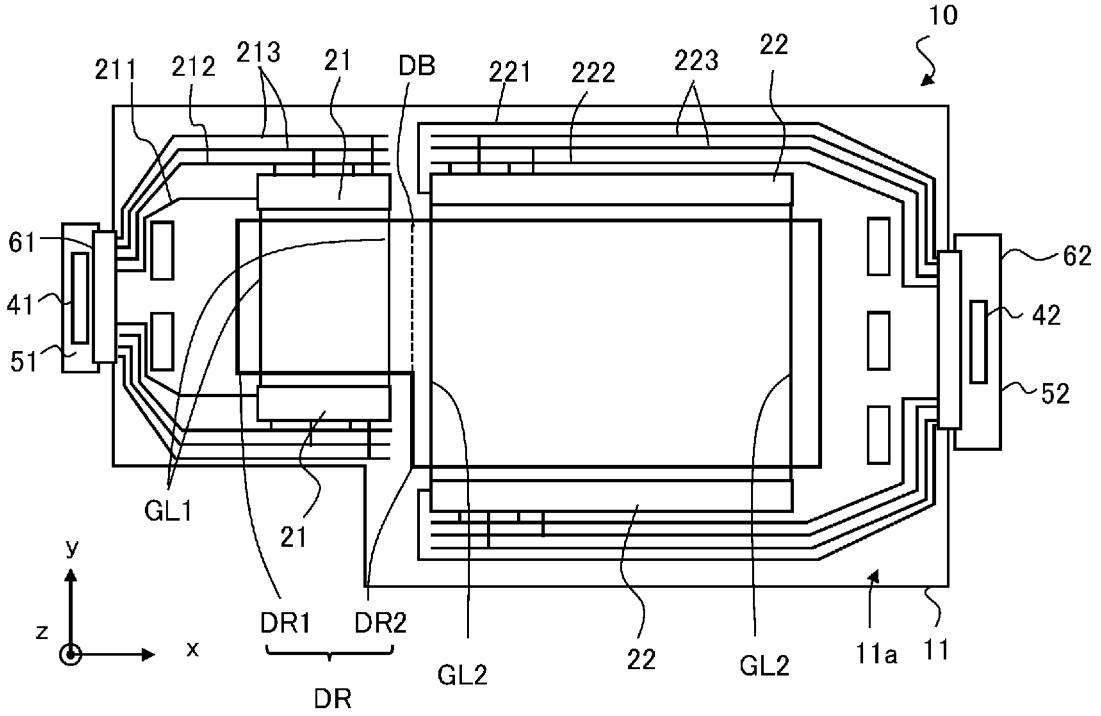
FIG. 17 is a view for illustrating an example of a connection between a first timing controller and a second timing controller and a first gate driver and a second gate driver according to the liquid crystal display device of the first embodiment.

For example, as illustrated in FIG. 17, the active matrix substrate 10 of the liquid crystal display device 101 further includes a first start pulse line 211, a first constant potential line 212, and a first clock signal line 213. The liquid crystal display device 101 further includes a second start pulse line 221, a second constant potential line 222, and a second clock signal line 223.

The first start pulse line 211, the first constant potential line 212, and the first clock signal line 213 connect the first timing controller 41 and the first gate driver 21. Similarly, the second start pulse line 221, the second constant potential line 222, and the second clock signal line 223 connect the second timing controller 42 and the second gate driver 22.

With such a configuration, the first gate driver 21 and the second gate driver 22 are independently controlled by the first timing controller 41 and the second timing controller 42, respectively, and can scan the gate bus lines as described above. Scanning of the first gate bus lines GL1 is started on the basis of a first scanning start signal transmitted from the first timing controller 41 to the first gate driver 21 via the first start pulse line 211. Scanning of the second gate bus line GL2 is started on the basis of a second scanning start signal transmitted from the second timing controller 42 to the second gate driver 22 via the second start pulse line 221. The first start pulse line 211 is connected to the first gate driver 21 at a position corresponding to the start position of scanning of the gate bus lines in the first region DR1 and the second region DR2 and close to the first gate bus line GL1 farthest from the boundary DB. Further, the second start pulse line 221 is connected to the second gate driver 22 at a position close to the second gate bus line GL2 closest to the boundary DB. The potential across the first constant potential line 212 and the second constant potential line 222 is, for example, a potential that turns off the TFTs of the pixels PX and the TFTs included in the first gate driver 21 and the second gate driver 22.

Figure 18:
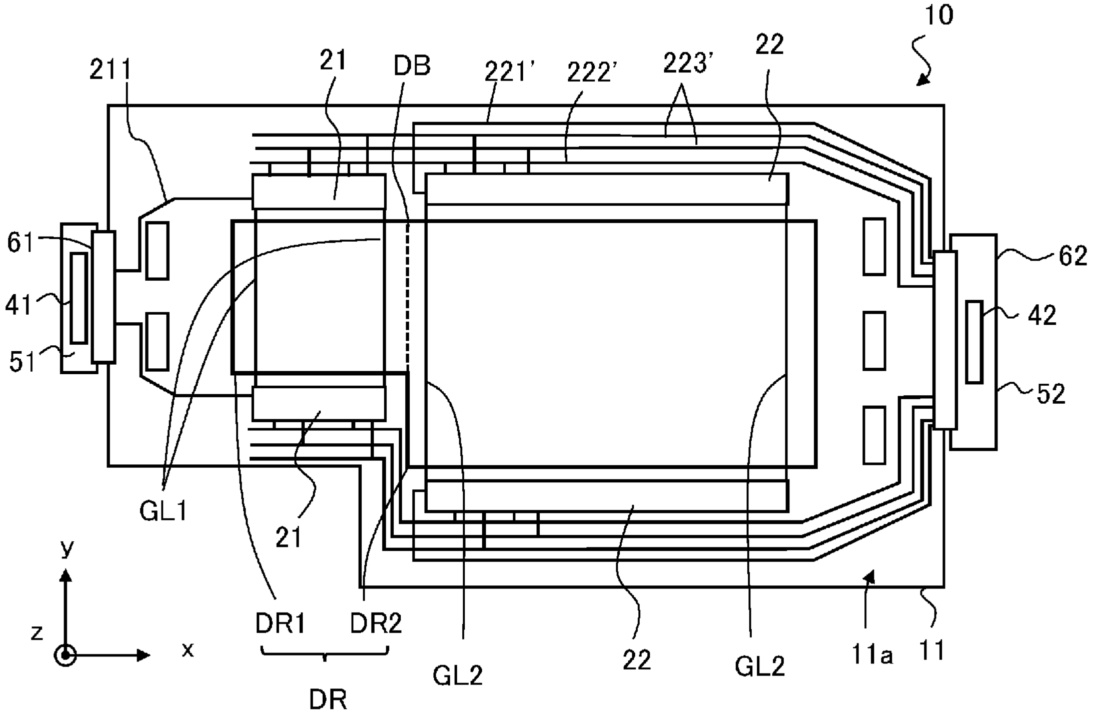
FIG. 18 is a view for illustrating an example of a connection between the first timing controller and the second timing controller and the first gate driver and the second gate driver according to the liquid crystal display device of the first embodiment.

Further, in the configuration illustrated in FIG. 18, the liquid crystal display device is different from the liquid crystal display device illustrated in FIG. 17 in that a constant potential line 222' and a clock signal line 223' connected in common to the first gate driver 21 and the second gate driver 22 are provided instead of the first constant potential line 212, the second constant potential line 222, the first clock signal line 213, and the second clock signal line 223. The constant potential line 222' and the clock signal line 223' are connected to the first gate driver 21, the second gate driver 22, and one of the first timing controller 41 and the second timing controller 42. The constant voltage signal is a signal having a constant value regardless of the scanning timing, and in a case where the driving frequencies of the first region DR1 and the second region DR2, the charging time of the pixels, and the like are the same, the clock signals supplied to the first gate driver 21 and the second gate driver 22 are the same. Thus, by making the wiring lines common in this manner, the circuit formed in the active matrix substrate 10 can be simplified.

Figure 19:
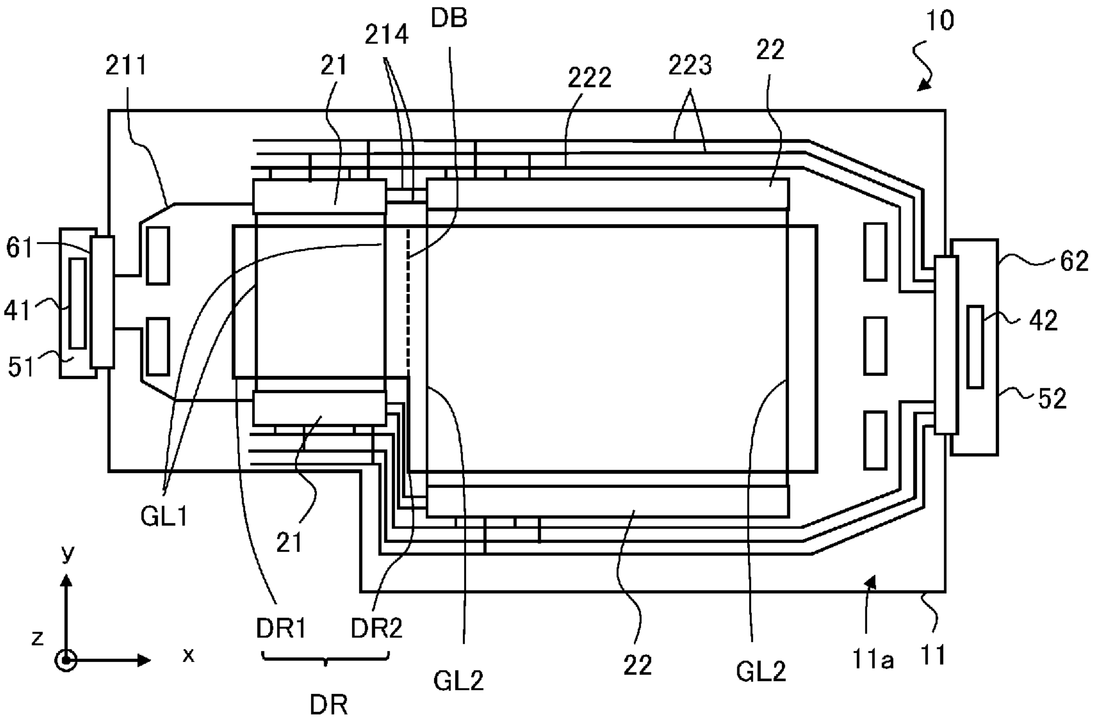
FIG. 19 is a view for illustrating an example of a connection between the first timing controller and the second timing controller and the first gate driver and the second gate driver according to the liquid crystal display device of the first embodiment.

In the configuration illustrated in FIG. 19, the liquid crystal display device includes a pair of signal lines 214 connecting the first gate driver 21 and the second gate driver 22 instead of the second start pulse line 221.

Scanning in a direction from the first gate bus line GL1 farthest from the boundary DB toward the first gate bus line GL1 closest to the boundary DB is started on the basis of a first scanning start signal transmitted from the first timing controller 41 to the first gate driver 21 via the first start pulse line 211. The signal output from the first gate driver 21 to the first gate bus line GL1 closest to the boundary DB or the first gate bus line GL1 near the first gate bus line GL1 closest to the boundary DB is also supplied to the second gate driver 22 via the signal line 214. The second gate driver 22 starts scanning the second gate bus line GL2 on the basis of the signal transmitted from the first gate driver 21 via the signal line 214. Further, on the basis of the start timing, the second gate driver 22 outputs a signal to the first gate driver 21 via the signal line 214. Thus, in the first gate driver 21, the transistor of the unit circuit closest to the boundary DB or the unit circuit near the unit circuit closest to the boundary DB is controlled. According to such control, the first gate driver 21 and the second gate driver 22 are integrally controlled.

Second Embodiment

Figure 20:
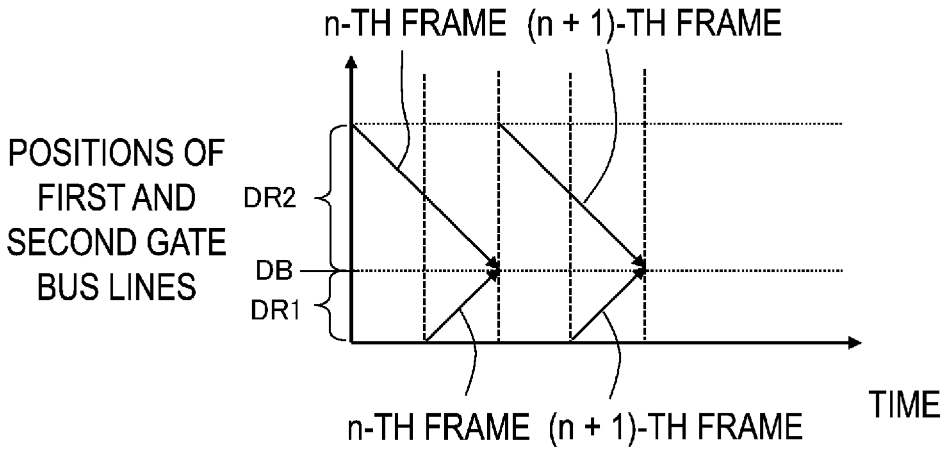
FIG. 20 is a schematic graph for describing the timing of scanning first gate bus lines and second gate bus lines according to a liquid crystal display device of a second embodiment.
Figure 21:
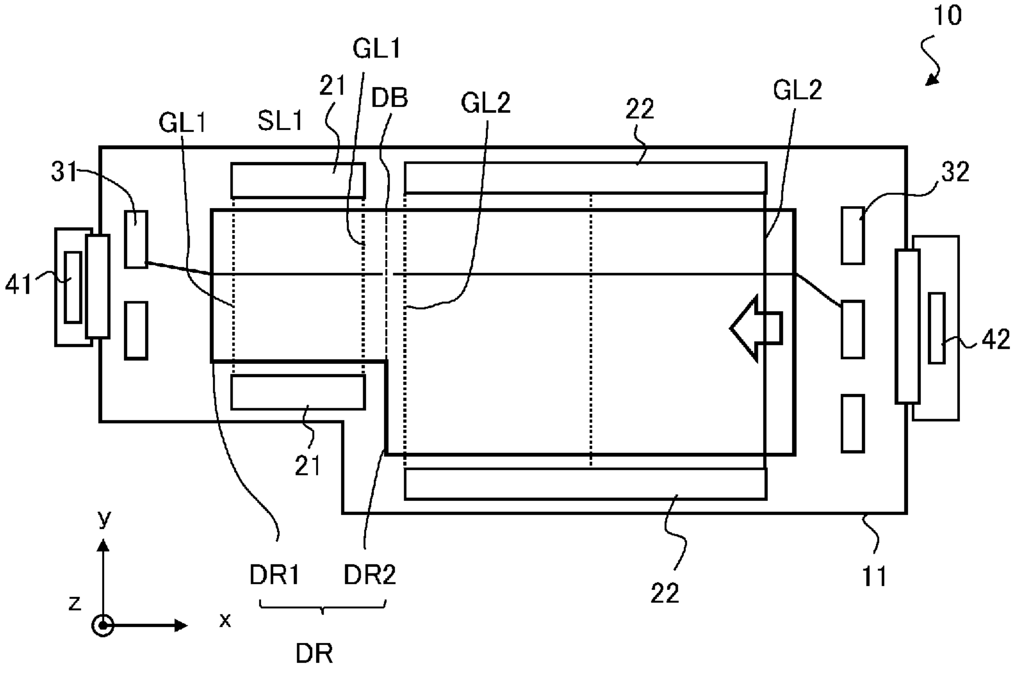
FIG. 21 is a schematic view for describing scanning of the first gate bus lines and the second gate bus lines according to the liquid crystal display device of the second embodiment.
Figure 22:
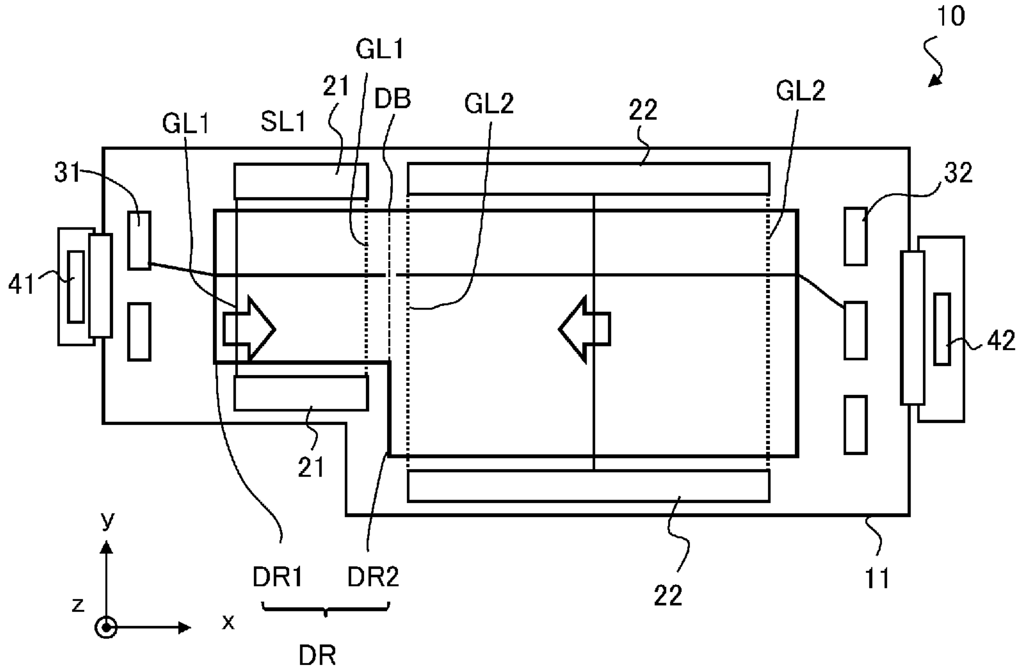
FIG. 22 is a schematic view for describing scanning of the first gate bus lines and the second gate bus lines according to the liquid crystal display device of the second embodiment.
Figure 23:
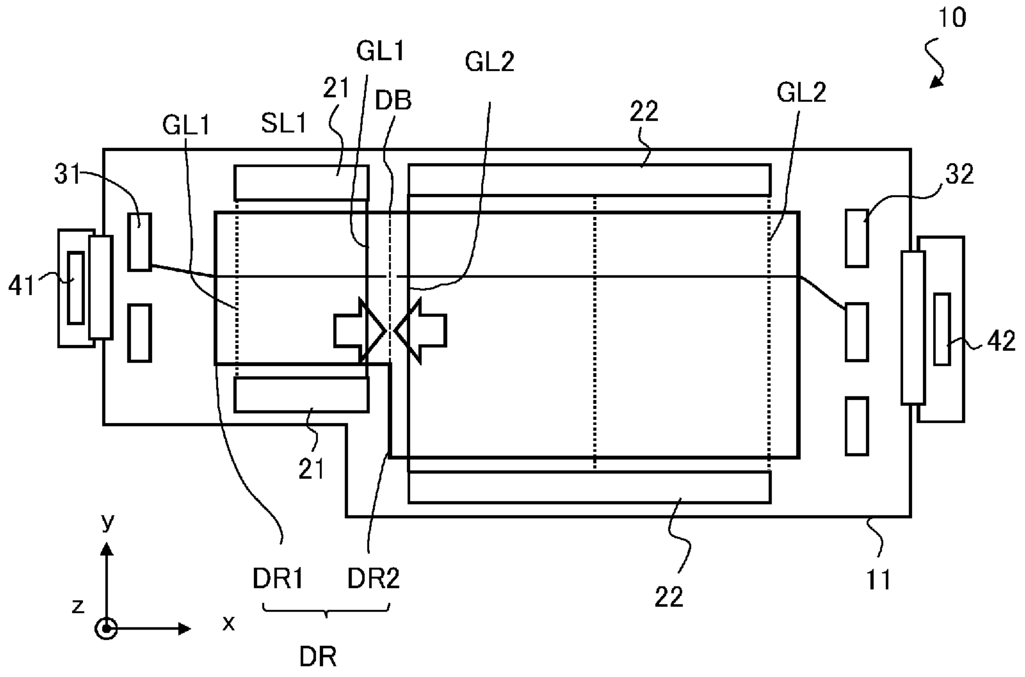
FIG. 23 is a schematic view for describing scanning of the first gate bus lines and the second gate bus lines according to the liquid crystal display device of the second embodiment.

FIG. 20 is a schematic graph for describing the timing of scanning the first gate bus lines GL1 and the second gate bus lines GL2 according to the liquid crystal display device of the present embodiment. As in the first embodiment, the horizontal axis represents time, and the vertical axis represents the positions of the first gate bus lines GL1 and the second gate bus lines GL2. FIGS. 21 to 23 are schematic views illustrating scanning of the first gate bus lines GL1 and the second gate bus lines GL2 at certain timing according to the liquid crystal display device of the present embodiment. In FIGS. 21 to 23, the first gate bus lines GL1 and the second gate bus lines GL2 are indicated by dashed lines except for the gate bus line being driven. The arrow indicates the scanning direction.

In the liquid crystal display device of the present embodiment, each of the first gate bus lines GL1 and the second gate bus lines GL2 is scanned from the gate bus line farthest from the boundary DB toward the gate bus line closest to the boundary DB.

First, the n-th frame of the image is displayed in the second region DR2. As illustrated in FIG. 21, the plurality of second gate bus lines GL2 are sequentially scanned in a direction from the second gate bus line GL2 farthest from the boundary DB toward the second gate bus line GL2 closest to the boundary DB from among the plurality of second gate bus lines GL2. A second scanning period is started by scanning the second gate bus line GL2 farthest from the boundary DB.

The n-th frame of the image is displayed in the second region DR2 while the second gate bus lines GL2 are being scanned. As illustrated in FIG. 22, the plurality of first gate bus lines GL1 are sequentially scanned in a direction from the first gate bus line GL1 farthest from the boundary DB toward the first gate bus line GL1 closest to the boundary DB from among the plurality of first gate bus lines GL1. The first scanning period is started by scanning the first gate bus line GL1 farthest from the boundary DB. Accordingly, the first gate bus lines GL1 and the second gate bus lines GL2 are simultaneously scanned, and a part of the second scanning period overlaps with the first scanning period.

As illustrated in FIG. 23, the first gate bus line GL1 closest to the boundary DB and the second gate bus line GL2 closest to the boundary DB are simultaneously scanned, and the first scanning period and the second scanning period end simultaneously. As described in the first embodiment, "simultaneously" means that the end timing of the first scanning period and the end timing of the second scanning period are within a range of equal to or less than five times the amount of time to scan one gate bus line or equal to or less than the amount of time taken to scan the gate bus lines whose number is corresponding to 5% of the number of the first gate bus lines GL1.

Thereafter, the process of FIGS. 21 to 23 is repeated, and, in the second region DR2, scanning of the second gate bus lines GL2 to display the (n+1)-th frame is started, and, in the first region DR1, scanning of the first gate bus lines GL1 to display the (n+1)-th frame is started.

In this manner, according to the present embodiment, the first scanning period of the n-th frame in the first region DR1 overlaps a part of the second scanning period of the n-th frame in the second region DR2. After the second scanning period of the n-th frame in the second region DR2 is started, the first scanning period of the n-th frame in the first region DR1 is started, and immediately after the end of the first scanning period of the n-th frame in the first region DR1, the second scanning period of the (n+1)-th frame in the second region DR2 is started.

According to the liquid crystal display device of the present embodiment, in a similar manner to the first embodiment, since a part of the second scanning period overlaps with the first scanning period, it is only necessary to secure a period for scanning the gate bus lines whose number is corresponding to the number of the second gate bus lines GL2 within one frame period. Thus, according to the liquid crystal display device of the present embodiment, each pixel can be appropriately charged, and an image can be displayed with excellent quality.

Figure 24:
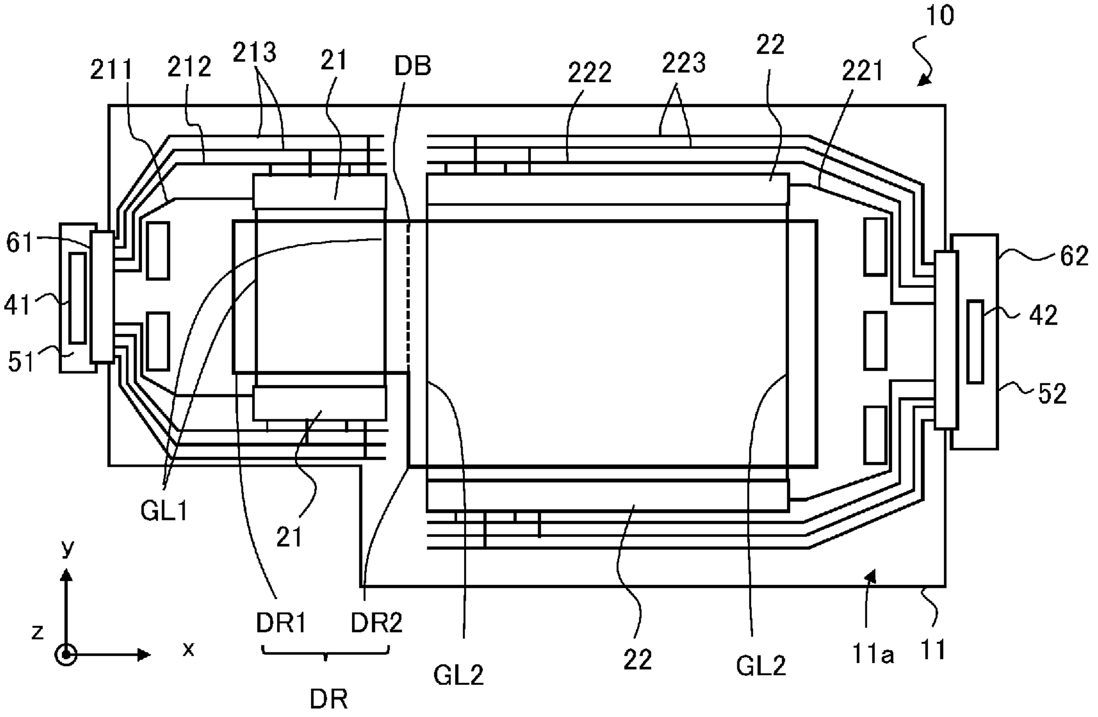
FIG. 24 is a view for illustrating an example of a connection between a first timing controller and a second timing controller and a first gate driver and a second gate driver according to the liquid crystal display device of the second embodiment.

In addition, according to the present embodiment, the first gate bus line GL1 closest to the boundary DB and the second gate bus line GL2 closest to the boundary DB, which are positioned on both sides of the boundary DB, are simultaneously scanned. Thus, the change in the voltage applied to the pixels is always approximately the same in the pixels connected to these two gate bus lines, and the change in the transmitted light of the pixels to be displayed (the amount of light transmitted through the pixels) is also approximately the same. Thus, the boundary DB between the first region DR1 and the second region DR2 is not conspicuous, and the first region DR1 and the second region DR2 are integrally displayed. Thus, with the liquid crystal display device according to the present embodiment, excellent display characteristics can be exhibited. FIG. 24 is a view for describing an example of a connection between the first timing controller 41 and the second timing controller 42 and the first gate driver 21 and the second gate driver 22 according to the liquid crystal display device of the present embodiment.

The connection of the wiring lines illustrated in FIG. 24 is different from the example of the first embodiment illustrated in FIG. 17 in that the second start pulse line 221 is connected to the second gate driver 22 at a position close to the second gate bus line GL2 farthest from the boundary DB. With such a connection, scanning of the second region DR2 can start from the second gate bus line GL2 farthest from the boundary DB.

The connection between the first timing controller 41 and the second timing controller 42 and the first gate driver 21 and the second gate driver 22 according to the liquid crystal display device of the present embodiment may be similar to the example of the first embodiment illustrated in FIGS. 17 and 18 except for the connection of the second start pulse line 221.

Third Embodiment

Figure 25:
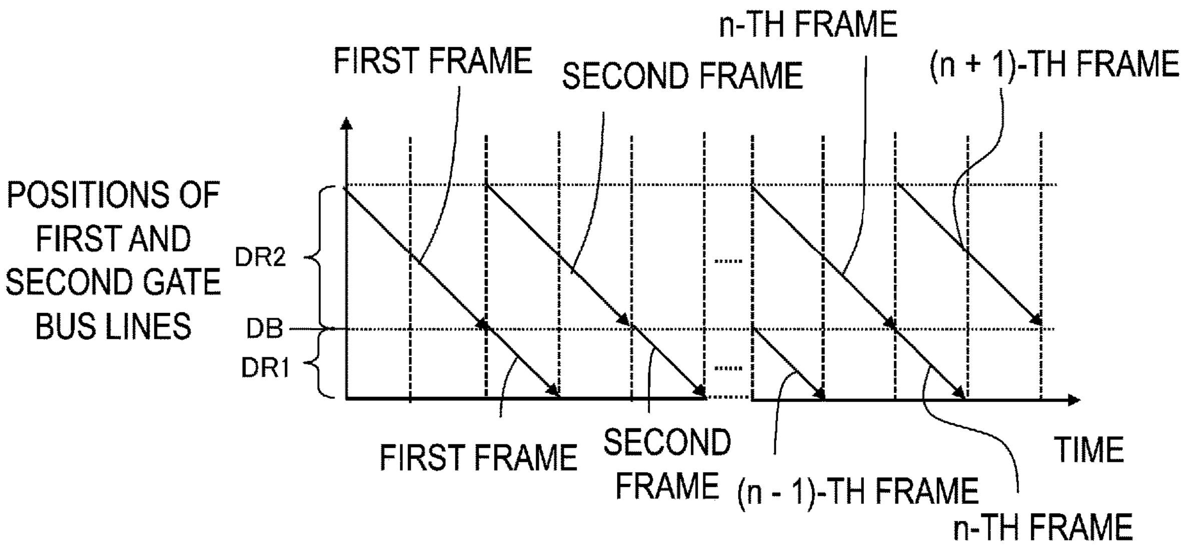
FIG. 25 is a schematic graph for describing the timing of scanning first gate bus lines and second gate bus lines according to a liquid crystal display device of a third embodiment.

FIG. 25 is a schematic graph for describing the timing of scanning the first gate bus lines GL1 and the second gate bus lines GL2 according to the liquid crystal display device of the present embodiment. As in the first embodiment, the horizontal axis represents time, and the vertical axis represents the positions of the first gate bus lines GL1 and the second gate bus lines GL2. FIGS. 26 to 30 are schematic views illustrating scanning of the first gate bus lines GL1 and the second gate bus lines GL2 at certain timing according to the liquid crystal display device of the present embodiment. In FIGS. 26 to 30, the first gate bus lines GL1 and the second gate bus lines GL2 are indicated by dashed lines except for the gate bus line being driven. The arrow indicates the scanning direction.

In the first embodiment, the plurality of first gate bus lines GL1 are sequentially scanned in a direction from, of the plurality of first gate bus lines GL1, the first gate bus line GL1 farthest from the boundary DB toward the first gate bus line GL1 closest to the boundary DB, and the plurality of second gate bus lines GL2 are sequentially scanned in a direction from, of the plurality of second gate bus lines GL2, the second gate bus line GL2 closest to the boundary DB toward the second gate bus line GL2 farthest from the boundary DB.

On the other hand, in the present embodiment, the plurality of first gate bus lines GL1 are sequentially scanned in a direction from, of the plurality of first gate bus lines GL1, the first gate bus line GL1 closest to the boundary DB toward the first gate bus line GL1 farthest from the boundary DB, and the plurality of second gate bus lines GL2 are sequentially scanned in a direction from, of the plurality of second gate bus lines GL2, the second gate bus line GL2 farthest from the boundary DB toward the second gate bus line GL2 closest to the boundary DB.

Figure 26:
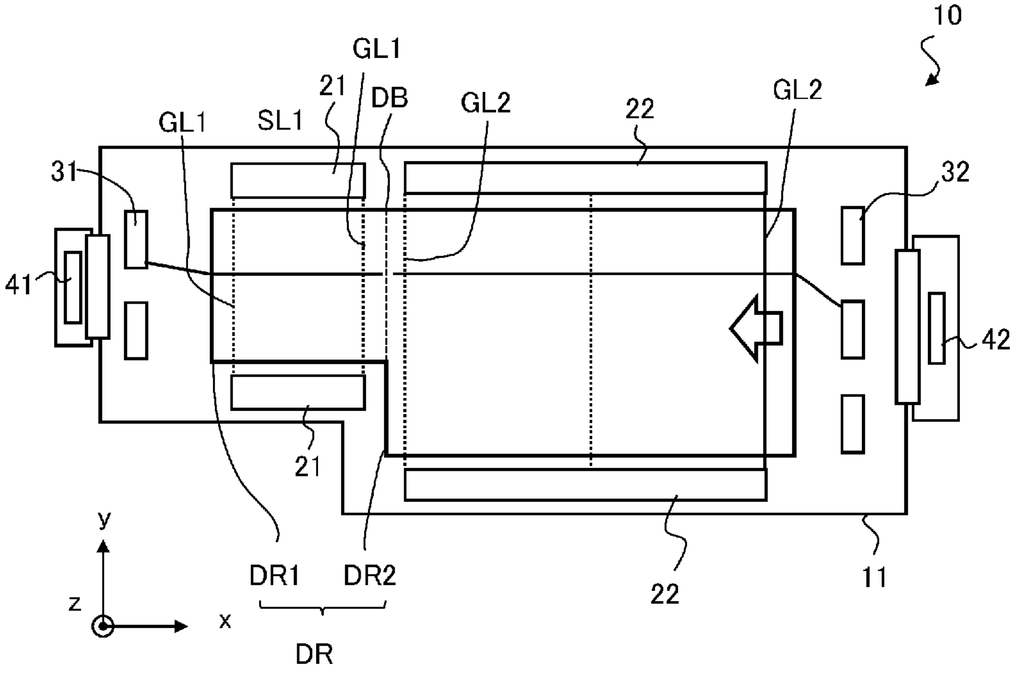
FIG. 26 is a schematic view for describing scanning of the first gate bus lines and the second gate bus lines according to the liquid crystal display device of the third embodiment.
Figure 27:
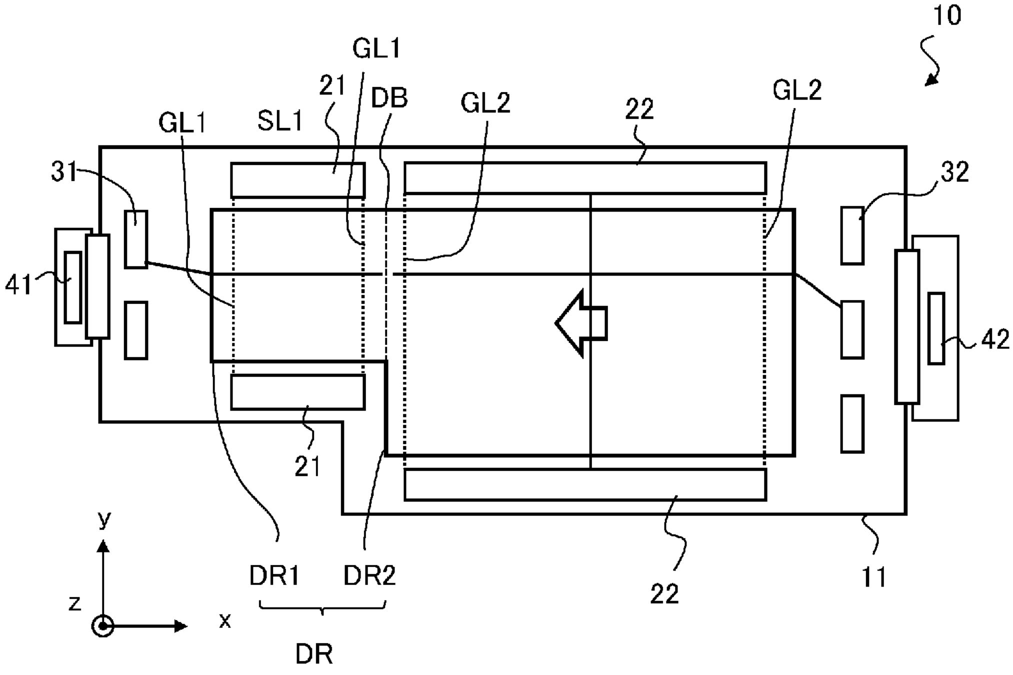
FIG. 27 is a schematic view for describing scanning of the first gate bus lines and the second gate bus lines according to the liquid crystal display device of the third embodiment.
Figure 28:
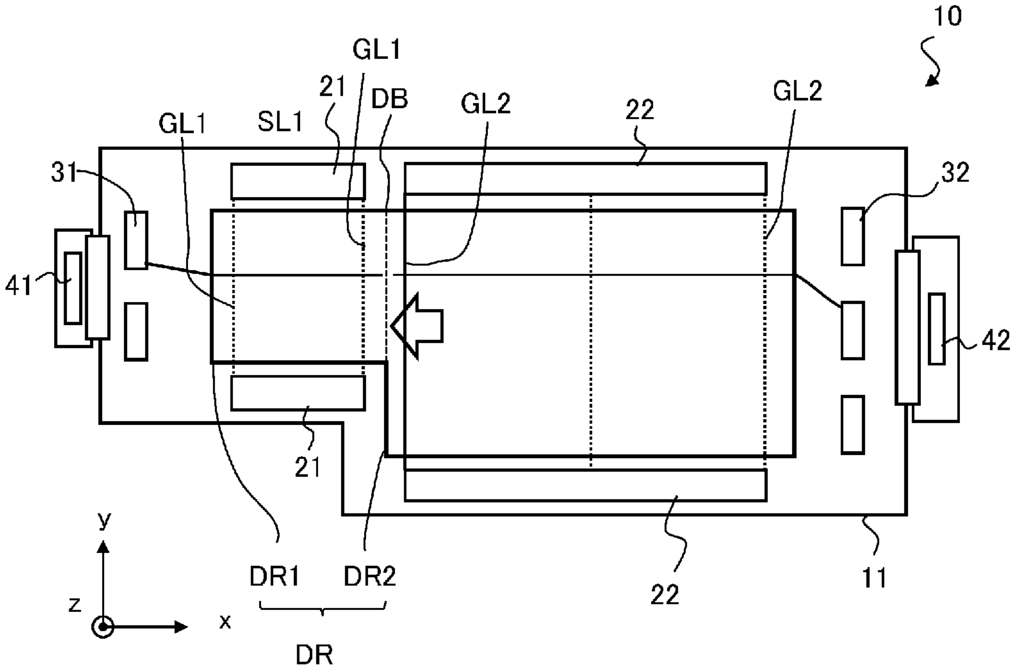
FIG. 28 is a schematic view for describing scanning of the first gate bus lines and the second gate bus lines according to the liquid crystal display device of the third embodiment.

As illustrated in FIGS. 26 to 28, first, a first frame of an image is displayed in the second region DR2 of the display region DR. The plurality of second gate bus lines GL2 are sequentially scanned in a direction from the second gate bus line GL2 farthest from the boundary DB toward the second gate bus line GL2 closest to the boundary DB from among the plurality of second gate bus lines GL2 to start the second scanning period. Thereafter, the second scanning period ends when the scanning of the second gate bus line GL2 closest to the boundary DB is complete.

Figure 29:
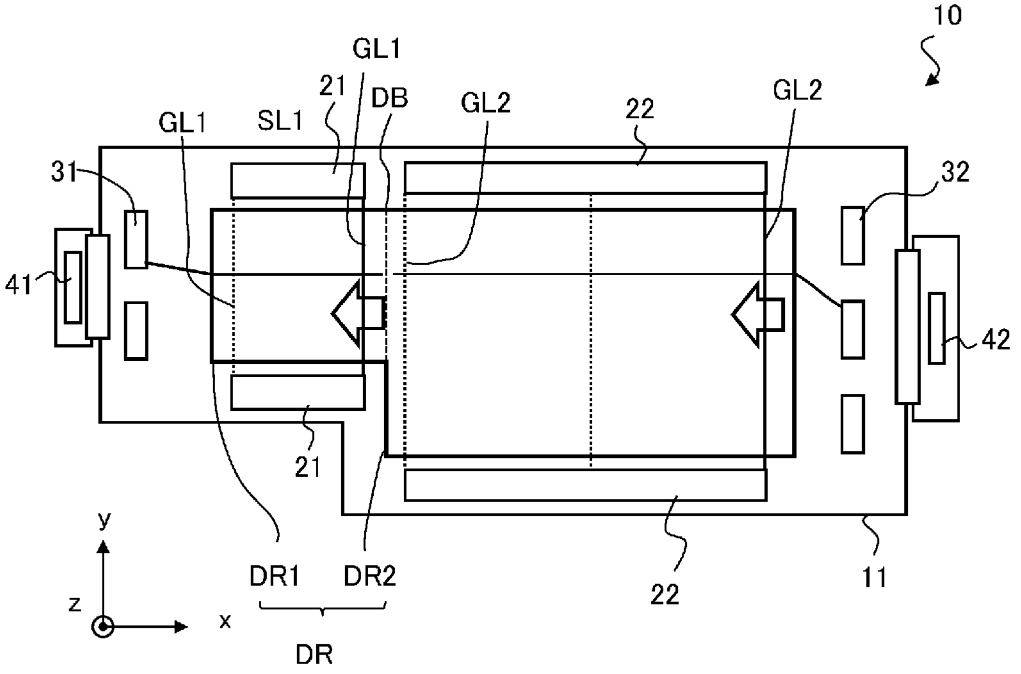
FIG. 29 is a schematic view for describing scanning of the first gate bus lines and the second gate bus lines according to the liquid crystal display device of the third embodiment.

Subsequently, as illustrated in FIG. 29, a first frame of an image is displayed in the first region DR1 of the display region DR. The plurality of first gate bus lines GL1 are sequentially scanned in a direction from the first gate bus line GL1 closest to the boundary DB toward the first gate bus line GL1 farthest from the boundary DB from among the plurality of first gate bus lines GL1. The first scanning period is started by scanning the first gate bus line GL1 closest to the boundary DB.

Also, at substantially the same time as the first scanning period is started, in order to display the second frame of the image in the second region DR2, the plurality of second gate bus lines GL2 are sequentially scanned in a direction from the second gate bus line GL2 farthest from the boundary DB toward the second gate bus line GL2 closest to the boundary DB to start the second scanning period again.

Figure 30:
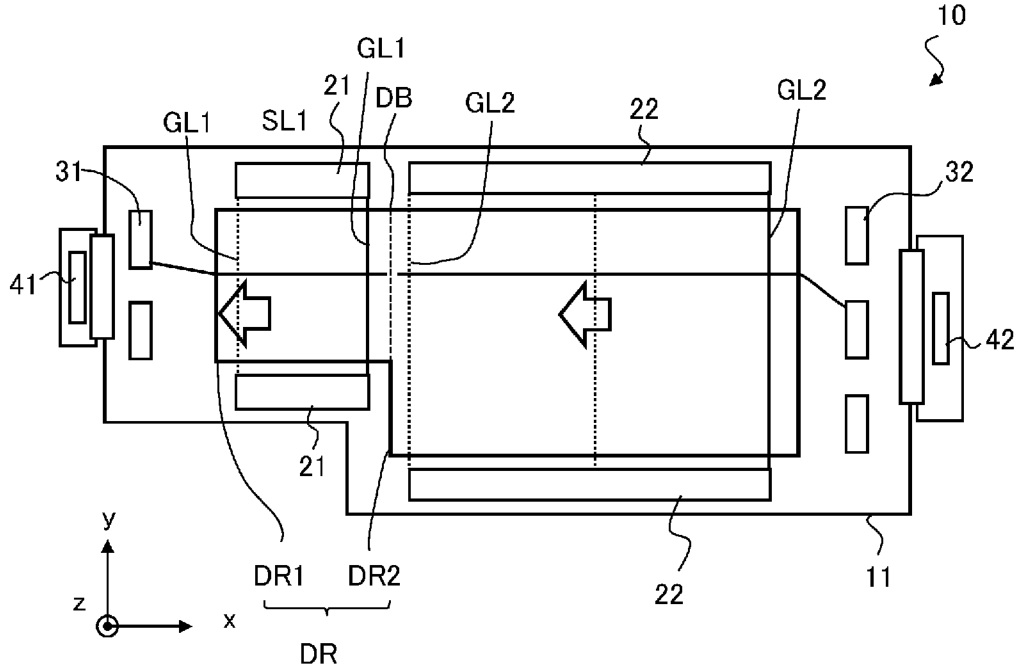
FIG. 30 is a schematic view for describing scanning of the first gate bus lines and the second gate bus lines according to the liquid crystal display device of the third embodiment.

Thereafter, as illustrated in FIG. 30, the first scanning period ends by completing scanning of the first gate bus line GL1 farthest from the boundary DB, and thereafter the second scanning period ends as illustrated in FIG. 28. Following the end of the second scanning period, as illustrated in FIG. 29, the first scanning period of the second frame and the second scanning period of the third frame start, and thereafter, similar scanning is repeated.

As illustrated in FIG. 25, the first scanning period of the (n−1)-th frame in the first region DR1 overlaps a part of the second scanning period of the n-th frame in the second region DR2, where n is any natural number. Thus, at substantially the same time as the start of the second scanning period of the n-th frame in the second region DR2, the first gate driver 21 starts the first scanning period of the (n−1)-th frame in the first region DR1. Immediately after the end of the second scanning period of the n-th frame in the second region DR2, the first gate driver 21 starts the first scanning period of the n-th frame in the first region DR1.

In this manner, according to the present embodiment also, the first scanning period and the second scanning period overlap one another. In addition, the first gate bus line GL1 closest to the boundary DB and the second gate bus line GL2 closest to the boundary DB, which are positioned on both sides of the boundary DB, are consecutively scanned. Thus, the change in the voltage applied to the pixels is always approximately the same in the pixels connected to the two gate bus lines, the boundary DB between the first region DR1 and the second region DR2 is not conspicuous, and the first region DR1 and the second region DR2 are integrally displayed.

Fourth Embodiment

Figure 31:
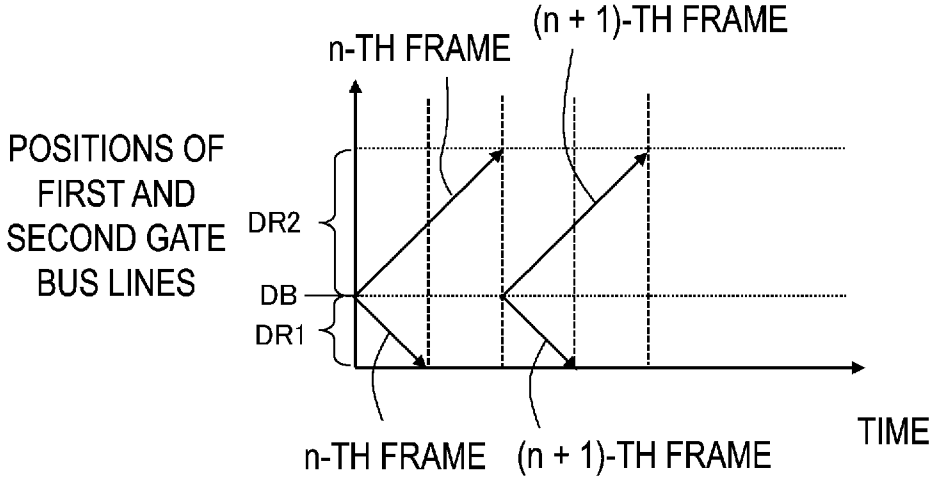
FIG. 31 is a schematic graph for describing the timing of scanning first gate bus lines and second gate bus lines according to a liquid crystal display device of a fourth embodiment.
Figure 32:
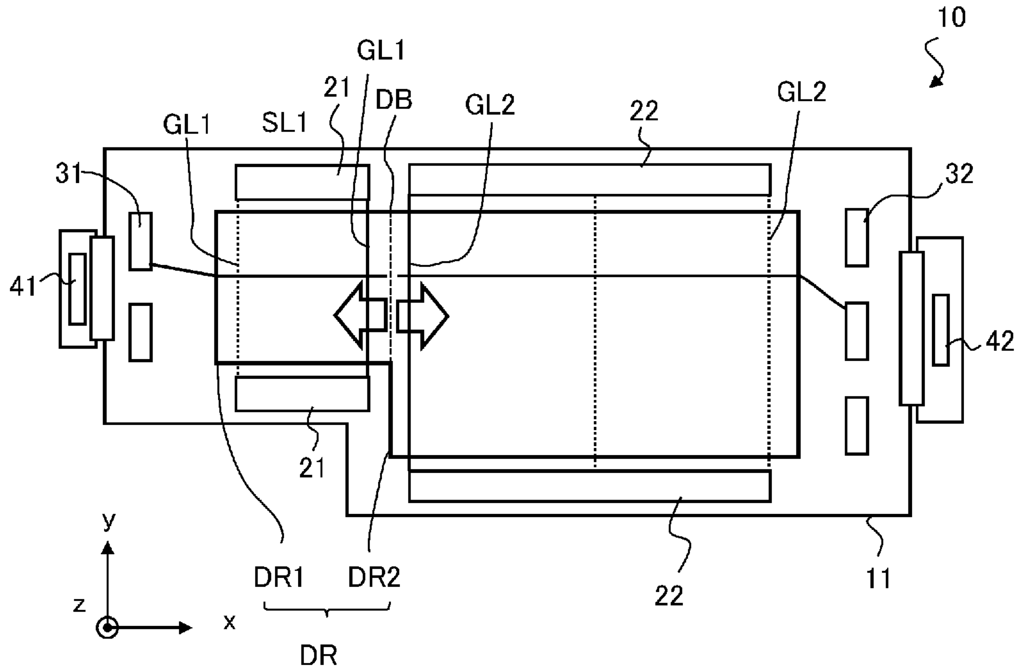
FIG. 32 is a schematic view for describing scanning of the first gate bus lines and the second gate bus lines according to the liquid crystal display device of the fourth embodiment.
Figure 33:
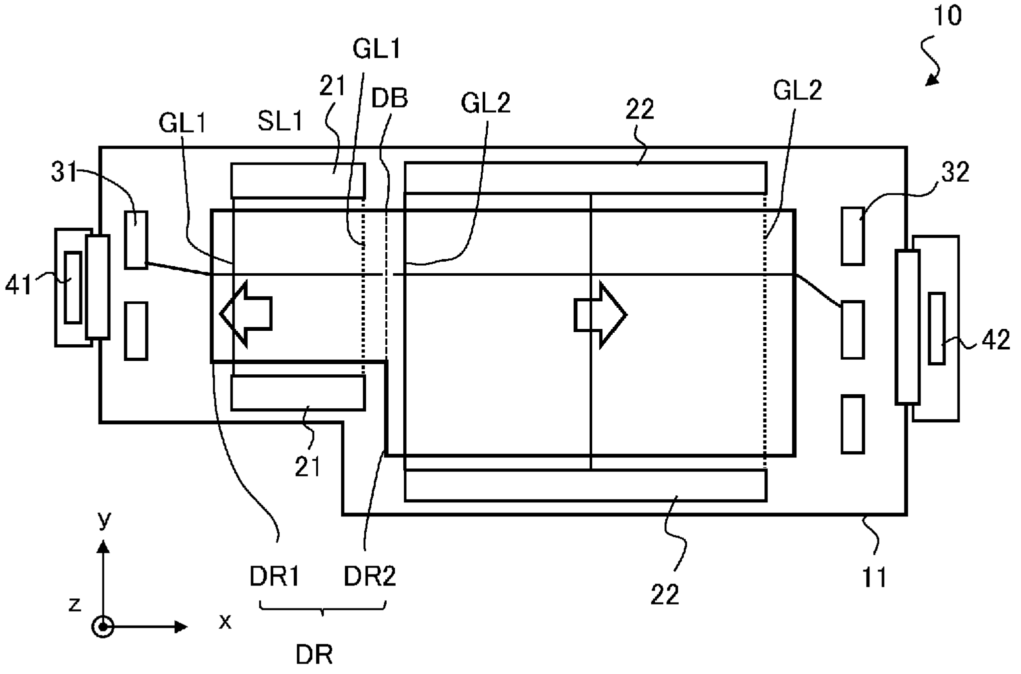
FIG. 33 is a schematic view for describing scanning of the first gate bus lines and the second gate bus lines according to the liquid crystal display device of the fourth embodiment.
Figure 34:
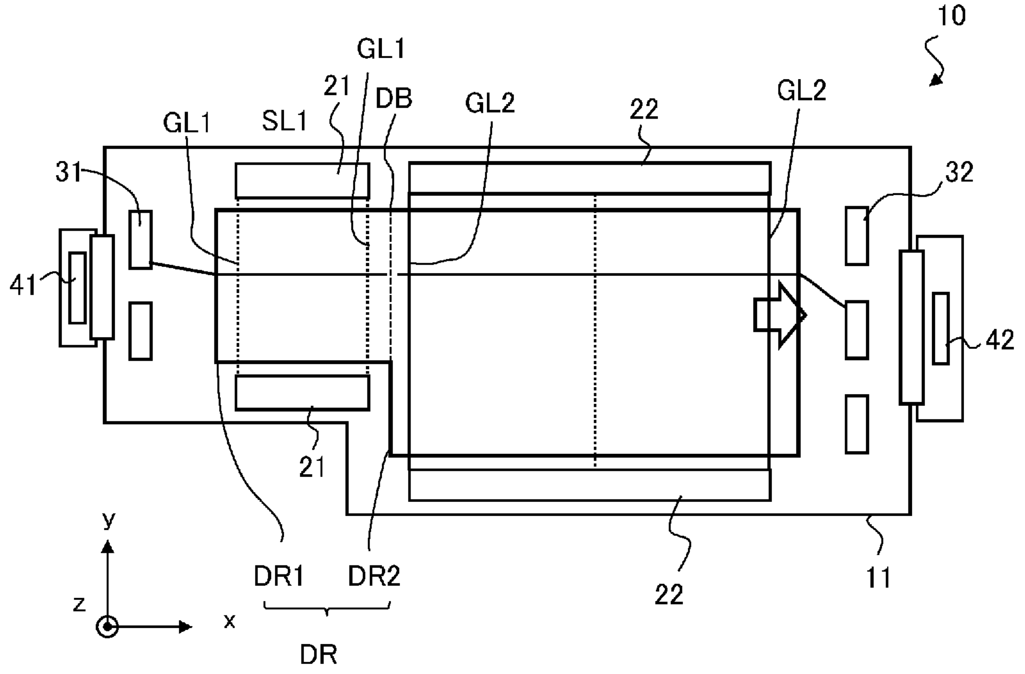
FIG. 34 is a schematic view for describing scanning of the first gate bus lines and the second gate bus lines according to the liquid crystal display device of the fourth embodiment.

FIG. 31 is a schematic graph for describing the timing of scanning the first gate bus lines GL1 and the second gate bus lines GL2 according to the liquid crystal display device of the present embodiment. As in the first embodiment, the horizontal axis represents time, and the vertical axis represents the positions of the first gate bus lines GL1 and the second gate bus lines GL2. FIGS. 32 to 34 are schematic views illustrating scanning of the first gate bus lines GL1 and the second gate bus lines GL2 at certain timing according to the liquid crystal display device of the present embodiment. In FIGS. 32 to 34, the first gate bus lines GL1 and the second gate bus lines GL2 are indicated by dashed lines except for the gate bus line being driven. The arrow indicates the scanning direction.

In the liquid crystal display device according to the present embodiment, the plurality of first gate bus lines GL1 are sequentially scanned in a direction from, of the plurality of first gate bus lines GL1, the first gate bus line GL1 closest to the boundary DB toward the first gate bus line GL1 farthest from the boundary DB, and the plurality of second gate bus lines GL2 are sequentially scanned in a direction from, of the plurality of second gate bus lines GL2, the second gate bus line GL2 closest to the boundary DB toward the second gate bus line GL2 farthest from the boundary DB.

As illustrated in FIG. 32, first, a first frame of an image is displayed in the first region DR1 of the display region DR. The plurality of first gate bus lines GL1 are sequentially scanned in a direction from the first gate bus line GL1 closest to the boundary DB toward the first gate bus line GL1 farthest from the boundary DB from among the plurality of first gate bus lines GL1. The first scanning period is started by scanning the first gate bus line GL1 closest to the boundary DB. Here, at substantially the same time as the first scanning period is started, in order to display the first frame of the image in the second region DR2, the plurality of second gate bus lines GL2 are sequentially scanned in a direction from the second gate bus line GL2 closest to the boundary DB toward the second gate bus line GL2 farthest from the boundary DB to start the second scanning period.

Thereafter, as illustrated in FIG. 33, the first scanning period ends, and subsequently, as illustrated in FIG. 34, the second scanning period ends. Thereafter, as illustrated in FIG. 32, the first scanning period of the second frame and the second scanning period of the second frame start at substantially the same time, and thereafter, similar scanning is repeated.

As illustrated in FIG. 31, the first scanning period of the n-th frame in the first region DR1 overlaps a part of the second scanning period of the n-th frame in the second region DR2, where n is any natural number. Thus, at substantially the same time as the start of the second scanning period of the n-th frame in the second region DR2, the first gate driver 21 starts the first scanning period of the n-th frame in the first region DR1. Immediately after the end of the second scanning period of the n-th frame in the second region DR2, the first gate driver 21 starts the first scanning period of the (n+1)-th frame in the first region DR1.

In this manner, according to the present embodiment also, the first scanning period and the second scanning period overlap one another. In addition, the first gate bus line GL1 closest to the boundary DB and the second gate bus line GL2 closest to the boundary DB, which are positioned on both sides of the boundary DB, are scanned at substantially the same time. Thus, the change in the voltage applied to the pixels is always approximately the same in the pixels connected to the two gate bus lines, the boundary DB between the first region DR1 and the second region DR2 is not conspicuous, and the first region DR1 and the second region DR2 are integrally displayed.

Other Embodiments

Figure 35:
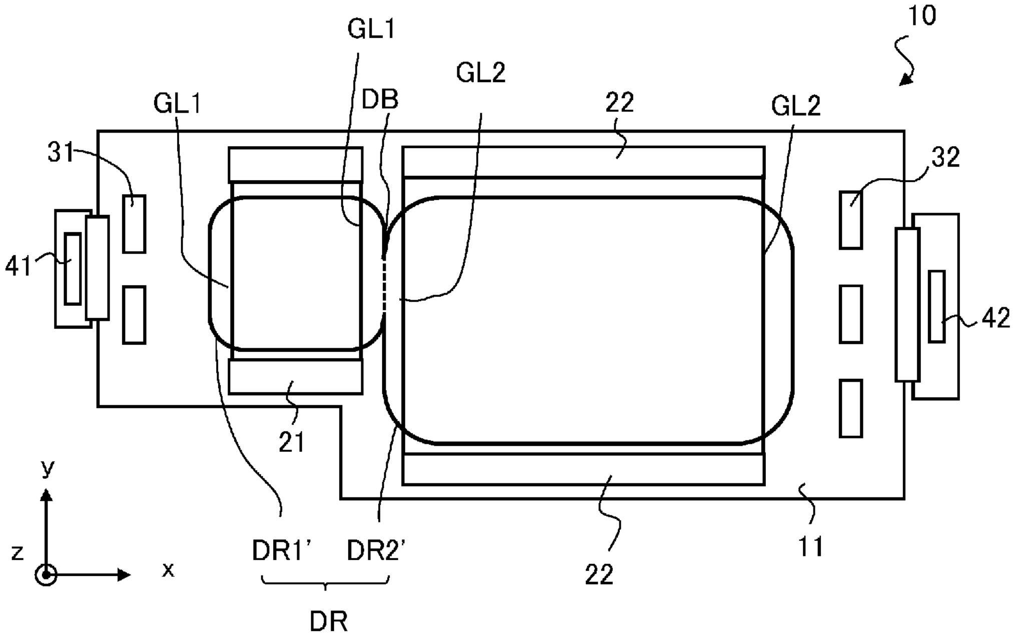
FIG. 35 is a view illustrating another embodiment of a first region and a second region in a liquid crystal display device.

The liquid crystal display device of the disclosure is not limited to the embodiments described above, and various modifications are possible. For example, as illustrated in FIG. 35, the first region DR1 and the second region DR2 are not limited to being rectangles. For example, a first region DR1' and a second region DR2' each having a shape including a curved line portion with rounded corners may be disposed on the main surface 11*a* of the substrate 11. Furthermore, the first region and the second region may have a polygonal shape other than a quadrangular shape, or may have a shape such as a circle, an oval, or an ellipse. In addition, the number of the first gate bus lines GL1 and the number of the second gate bus lines GL2 can be variously modified. For example, when the number of the first gate bus lines GL1 is 1920, the number of the second gate bus lines GL2 may be 2000 or 5760.

Also, in the first embodiment, the first gate bus lines GL1 and the second gate bus lines GL2 are scanned so that the first scanning period of the n-th frame in the first region DR1 overlaps with a part of the second scanning period of the (n−1)-th frame in the second region DR2. However, the first gate bus lines GL1 and the second gate bus lines GL2 may be scanned so that the first scanning period of the n-th frame in the first region DR1 overlaps with a part of the second scanning period of the n-th frame in the second region DR2.

In addition, in the first and second embodiments, for example, in a case where images displayed in the first region DR1 and the second region DR2 each include a frame region and the frame regions of the two images are connected to one another, even if the positions of the frames of the images displayed in the first region DR1 and the second region DR2 are different, the display of the frame region itself does not change much. In such a case, even if the positions of the frames of the images displayed in the first region DR1 and the second region DR2 are slightly different, the display characteristics in the entire display region DR are less likely to be greatly affected. Thus, the position of the frame in the first scanning period and the position of the frame in the second scanning period are not limited to the relationship described in the above embodiments and may be offset by about several frames.

Furthermore, the liquid crystal display device of the disclosure may display completely independent images in the first region DR1 and the second region DR2 in a certain period, for example. In this case, the position of the frame in the first scanning period and the position of the frame in the second scanning period are not limited to the relationship described in the above embodiments and may have any relationship.

The first timing controller 41 and the second timing controller 42 may be mounted on the same circuit substrate or may be connected to one end and the other end of the substrate 11 via FPCs. In addition, the first timing controller 41 and the second timing controller 42 may be packaged into one.

A liquid crystal display device according to the disclosure can be explained as follows.

A liquid crystal display device according to a first configuration includes:

- a substrate including a display region including a first region and a second region adjacent to one another in a first direction and a main surface including a non-display region located outside of the display region, a width of the second region in the first direction being greater than a width of the first region;
- a plurality of first gate bus lines each extending in a second direction perpendicular to the first direction and arrayed in the first direction in the first region;
- a plurality of second gate bus lines each extending in the second direction and arrayed in the first direction in the second region, the number of the plurality of second gate bus lines being more than the number of the plurality of first gate bus lines;
- a plurality of first source bus lines each extending in the first direction and arrayed in the second direction in the first region;
- a plurality of second source bus lines each extending in the first direction and arrayed in the second direction in the second region; and a first gate driver and a second gate driver, both of which are disposed in the non-display region, wherein the plurality of first gate bus lines are connected to the first gate driver, the plurality of second gate bus lines are connected to the second gate driver, a period in which the first gate driver scans the plurality of first gate bus lines from a first gate bus line farthest from a boundary between the first region and the second region toward a first gate bus line closest to the boundary from among the plurality of first gate bus lines or a period in which the first gate driver scans the plurality of first gate bus lines from the first gate bus line closest to the boundary between the first region and the second region toward the first gate bus line farthest from the boundary from among the plurality of first gate bus lines is defined as a first scanning period, a period in which the second gate driver scans the plurality of second gate bus lines from a second gate bus line farthest from the boundary between the first region and the second region toward a second gate bus line closest to the boundary from among the plurality of second gate bus lines or a period in which the second gate driver scans the plurality of second gate bus lines from the second gate bus line closest to the boundary between the first region and the second region toward the second gate bus line farthest from the boundary from among the plurality of second gate bus lines is defined as a second scanning period, and the first gate driver sequentially outputs a scanning signal to the plurality of first gate bus lines in the first scanning period, the second gate driver sequentially outputs a scanning signal to the plurality of second gate bus lines in the second scanning period, and substantially all of the first scanning period overlaps a part of the second scanning period.

According to the first configuration, since the first scanning period and a part of the second scanning period overlap, charging time for the pixels can be sufficiently secured.

The liquid crystal display device according to a second configuration has the first configuration, wherein the first gate driver and the second gate driver may be driven, the first scanning period and the second scanning period ending substantially simultaneously.

The liquid crystal display device according to a third configuration has the first configuration, wherein the first gate driver and the second gate driver may be driven, the first scanning period and the second scanning period starting substantially simultaneously.

The liquid crystal display device according to a fourth configuration has the first configuration and further includes a first source driver and a second source driver, wherein the plurality of first source bus lines may be connected to the first source driver, the plurality of second source bus lines may be connected to the second source driver, the first source driver may output an image signal to the plurality of first source bus lines in the first scanning period, and the second source driver may output an image signal to the plurality of second source bus lines in the second scanning period.

The liquid crystal display device according to a fifth configuration has the second configuration, wherein the first gate driver may scan the plurality of first gate bus lines in a direction from the first gate bus line farthest from the boundary between the first region and the second region toward the first gate bus line closest to the boundary from among the plurality of first gate bus lines in the first scanning period, and the second gate driver may scan the plurality of second gate bus lines in a direction from the second gate bus line closest to the boundary toward the second gate bus line farthest from the boundary from among the plurality of second gate bus lines in the second scanning period.

The liquid crystal display device according to a sixth configuration has the fifth configuration, wherein the first scanning period of an n-th frame in the first region may overlap a part of the second scanning period of an (n−1)-th frame in the second region, where n is any natural number.

The liquid crystal display device according to a seventh configuration has the sixth configuration, wherein the first gate driver may start the first scanning period of the n-th frame in the first region after the second scanning period of the (n−1)-th frame in the second region has started.

The liquid crystal display device according to an eighth configuration has the seventh configuration, wherein the second gate driver may start the second scanning period of an n-th frame in the second region immediately after the first scanning period of the n-th frame in the first region has ended.

The liquid crystal display device according to a ninth configuration has the second configuration, wherein the first gate driver may scan the plurality of first gate bus lines in a direction from the first gate bus line farthest from the boundary between the first region and the second region toward the first gate bus line closest to the boundary from among the plurality of first gate bus lines in the first scanning period, and the second gate driver may scan the plurality of second gate bus lines in a direction from the second gate bus line farthest from the boundary toward the second gate bus line closest to the boundary from among the plurality of second gate bus lines in the second scanning period.

The liquid crystal display device according to a tenth configuration has the ninth configuration, wherein the first scanning period of an n-th frame in the first region may overlap a part of the second scanning period of an n-th frame in the second region, where n is any natural number.

The liquid crystal display device according to an eleventh configuration has the tenth configuration, wherein the first gate driver may start the first scanning period of the n-th frame in the first region after the second scanning period of the n-th frame in the second region has started.

The liquid crystal display device according to a twelfth configuration has the eleventh configuration, wherein the second gate driver may start the second scanning period of an (n+1)-th frame in the second region immediately after the first scanning period of the n-th frame in the first region has ended.

The liquid crystal display device according to a thirteenth configuration has the third configuration, wherein the first gate driver may scan the plurality of first gate bus lines in a direction from the first gate bus line closest to the boundary toward the first gate bus line farthest from the boundary from among the plurality of first gate bus lines in the first scanning period, and the second gate driver may scan the plurality of second gate bus lines in a direction from the second gate bus line farthest from the boundary toward the second gate bus line closest to the boundary from among the plurality of second gate bus lines in the second scanning period.

The liquid crystal display device according to a fourteenth configuration has the thirteenth configuration, wherein the first scanning period of an (n−1)-th frame in the first region may overlap a part of the second scanning period of an n-th frame in the second region, where n is any natural number.

The liquid crystal display device according to a fifteenth configuration has the fourteenth configuration, wherein the first gate driver may start the first scanning period of the (n−1)-th frame in the first region substantially simultaneously with a start of the second scanning period of the n-th frame in the second region.

The liquid crystal display device according to a sixteenth configuration has the fifteenth configuration, wherein the first gate driver may start the first scanning period of an n-th frame in the first region immediately after the second scanning period of the n-th frame in the second region has ended.

The liquid crystal display device according to a seventeenth configuration has the third configuration, wherein the first gate driver may scan the plurality of first gate bus lines in a direction from the first gate bus line closest to the boundary toward the first gate bus line farthest from the boundary from among the plurality of first gate bus lines in the first scanning period, and the second gate driver may scan the plurality of second gate bus lines in a direction from the second gate bus line closest to the boundary toward the second gate bus line farthest from the boundary from among the plurality of second gate bus lines in the second scanning period.

The liquid crystal display device according to an eighteenth configuration has the seventeenth configuration, wherein the first scanning period of an n-th frame in the first region may overlap a part of the second scanning period of an n-th frame in the second region, where n is any natural number.

The liquid crystal display device according to a nineteenth configuration has the eighteenth configuration, wherein the first gate driver may start the first scanning period of the n-th frame in the first region substantially simultaneously with a start of the second scanning period of the n-th frame in the second region.

The liquid crystal display device according to a twentieth configuration has the nineteenth configuration, wherein the first gate driver may start the first scanning period of an (n+1)-th frame in the first region immediately after the second scanning period of the n-th frame in the second region has ended.

The liquid crystal display device according to a twenty-first configuration has any one of the first configuration to twentieth configuration and may further include:

a first start pulse line connected to the first gate driver, the first start pulse line configured to start scanning of the plurality of first gate bus lines; and a second start pulse line connected to the second gate driver, the second start pulse line configured to start scanning of the plurality of second gate bus lines.

The liquid crystal display device according to a twenty-second configuration has the twenty-first configuration and further includes:

a first constant potential line and/or a first clock signal line, the first constant potential line connected to the first gate driver, the first clock signal line connected to the first gate driver; and a second constant potential line and/or a second clock signal line, the second constant potential line connected to the second gate driver, the second clock signal line connected to the second gate driver, wherein the second constant potential line and the second clock signal line may be not directly connected to the first constant potential line and the first clock signal line on the substrate.

The liquid crystal display device according to a twenty-third configuration has the twenty-first configuration and further includes a constant potential line and/or a clock signal line, the constant potential line connected to the first gate driver and the second gate driver, the clock signal line connected to the first gate driver and the second gate driver.

The liquid crystal display device according to a twenty-fourth configuration has any one of the first configuration to twentieth configuration and further includes:

a start pulse line connected to the first gate driver, the start pulse line configured to start scanning of the plurality of first gate bus lines; and at least one signal line configured to connect the first gate driver and the second gate driver, wherein scanning of the plurality of first gate bus lines may be started on a basis of a scanning start signal transmitted from the start pulse line to the first gate driver, and scanning of the plurality of second gate bus lines may be started on a basis of a signal transmitted from the at least one signal line to the second gate driver.

The liquid crystal display device according to a twenty-fifth configuration has the twenty-fourth configuration and may further include a constant potential line and a clock signal line, both of which are connected to the first gate driver and/or the second gate driver.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device, comprising:

a substrate including a display region including a first region and a second region adjacent to one another in a first direction and a main surface including a non-display region located outside of the display region, a width of the second region in the first direction being greater than a width of the first region, wherein the first region and the second region are continuous and form an integral display region;

a plurality of first gate bus lines, each extending in a second direction perpendicular to the first direction and arrayed in the first direction in the first region;

a plurality of second gate bus lines, each extending in the second direction and arrayed in the first direction in the second region, a number of the plurality of second gate bus lines being more than a number of the plurality of first gate bus lines;

a plurality of first source bus lines, each extending in the first direction and arrayed in the second direction in the first region;

a plurality of second source bus lines, each extending in the first direction and arrayed in the second direction in the second region; and a first gate driver and a second gate driver, both of which are disposed in the non-display region, wherein the plurality of first gate bus lines is connected to the first gate driver, the plurality of second gate bus lines is connected to the second gate driver, a period in which the first gate driver scans the plurality of first gate bus lines from a first gate bus line, among the plurality of first gate bus lines, farthest from a boundary between the first region and the second region toward a first gate bus line, among the plurality of first gate bus lines, closest to the boundary or a period in which the first gate driver scans the plurality of first gate bus lines from the first gate bus line closest to the boundary toward the first gate bus line farthest from the boundary is defined as a first scanning period, a period in which the second gate driver scans the plurality of second gate bus lines from a second gate bus line, among the plurality of second gate bus lines, farthest from the boundary toward a second gate bus line, among the plurality of second gate bus lines, closest to the boundary or a period in which the second gate driver scans the plurality of second gate bus lines from the second gate bus line closest to the boundary toward the second gate bus line farthest from the boundary is defined as a second scanning period, and the first gate driver sequentially outputs a scanning signal to the plurality of first gate bus lines in the first scanning period, the second gate driver sequentially outputs a scanning signal to the plurality of second gate bus lines in the second scanning period, and all of the first scanning period substantially overlaps a part of the second scanning period.

2. The liquid crystal display device according to claim 1, wherein the first gate driver and the second gate driver are driven, such that the first scanning period and the second scanning period ending substantially simultaneously.

3. The liquid crystal display device according to claim 1, wherein the first gate driver and the second gate driver are driven, such that the first scanning period and the second scanning period starting substantially simultaneously.

4. The liquid crystal display device according to claim 1, further comprising:

a first source driver and a second source driver, wherein the plurality of first source bus lines is connected to the first source driver, the plurality of second source bus lines is connected to the second source driver, the first source driver outputs an image signal to the plurality of first source bus lines in the first scanning period, and the second source driver outputs an image signal to the plurality of second source bus lines in the second scanning period.

5. The liquid crystal display device according to claim 2, wherein the first gate driver scans the plurality of first gate bus lines in a direction from the first gate bus line farthest from the boundary toward the first gate bus line closest to the boundary in the first scanning period, and the second gate driver scans the plurality of second gate bus lines in a direction from the second gate bus line closest to the boundary toward the second gate bus line farthest from the boundary in the second scanning period.

6. The liquid crystal display device according to claim 5, wherein the first scanning period of an n-th frame in the first region overlaps a part of the second scanning period of an (n−1)-th frame in the second region, where n is a positive integer greater than one.

7. The liquid crystal display device according to claim 6, wherein the first gate driver starts the first scanning period of the n-th frame in the first region after the second scanning period of the (n−1)-th frame in the second region has started.

8. The liquid crystal display device according to claim 7, wherein the second gate driver starts the second scanning period of an n-th frame in the second region immediately after the first scanning period of the n-th frame in the first region has ended.

9. The liquid crystal display device according to claim 2, wherein the first gate driver scans the plurality of first gate bus lines in a direction from the first gate bus line farthest from the boundary toward the first gate bus line closest to the boundary in the first scanning period, and the second gate driver scans the plurality of second gate bus lines in a direction from the second gate bus line farthest from the boundary toward the second gate bus line closest to the boundary in the second scanning period.

10. The liquid crystal display device according to claim 9, wherein the first scanning period of an n-th frame in the first region overlaps a part of the second scanning period of an n-th frame in the second region, where n is a positive integer greater than one.

11. The liquid crystal display device according to claim 10, wherein the first gate driver starts the first scanning period of the n-th frame in the first region after the second scanning period of the n-th frame in the second region has started.

12. The liquid crystal display device according to claim 11, wherein the second gate driver starts the second scanning period of an (n+1)-th frame in the second region immediately after the first scanning period of the n-th frame in the first region has ended.

13. The liquid crystal display device according to claim 3, wherein the first gate driver scans the plurality of first gate bus lines in a direction from the first gate bus line closest to the boundary toward the first gate bus line farthest from the boundary in the first scanning period, and the second gate driver scans the plurality of second gate bus lines in a direction from the second gate bus line farthest from the boundary toward the second gate bus line closest to the boundary in the second scanning period.

14. The liquid crystal display device according to claim 13, wherein the first scanning period of an (n−1)-th frame in the first region overlaps a part of the second scanning period of an n-th frame in the second region, where n is a positive integer greater than one.

15. The liquid crystal display device according to claim 14, wherein the first gate driver starts the first scanning period of the (n−1)-th frame in the first region substantially simultaneously with a start of the second scanning period of the n-th frame in the second region.

16. The liquid crystal display device according to claim 15, wherein the first gate driver starts the first scanning period of an n-th frame in the first region immediately after the second scanning period of the n-th frame in the second region has ended.

17. The liquid crystal display device according to claim 3, wherein the first gate driver scans the plurality of first gate bus lines in a direction from the first gate bus line closest to the boundary toward the first gate bus line farthest from the boundary in the first scanning period, and the second gate driver scans the plurality of second gate bus lines in a direction from the second gate bus line closest to the boundary toward the second gate bus line farthest from the boundary in the second scanning period.

18. The liquid crystal display device according to claim 17, wherein the first scanning period of an n-th frame in the first region overlaps a part of the second scanning period of an n-th frame in the second region, where n is a positive integer greater than one.

19. The liquid crystal display device according to claim 18, wherein the first gate driver starts the first scanning period of the n-th frame in the first region substantially simultaneously with a start of the second scanning period of the n-th frame in the second region.

20. The liquid crystal display device according to claim 19, wherein the first gate driver starts the first scanning period of an (n+1)-th frame in the first region immediately after the second scanning period of the n-th frame in the second region has ended.

21. The liquid crystal display device according to claim 1, further comprising:

a first start pulse line connected to the first gate driver, the first start pulse line configured to start scanning of the plurality of first gate bus lines; and a second start pulse line connected to the second gate driver, the second start pulse line configured to start scanning of the plurality of second gate bus lines.

22. The liquid crystal display device according to claim 21, further comprising:

a first constant potential line and/or a first clock signal line, the first constant potential line connected to the first gate driver, the first clock signal line connected to the first gate driver, and a second constant potential line and/or a second clock signal line, the second constant potential line connected to the second gate driver, the second clock signal line connected to the second gate driver, wherein the second constant potential line and the second clock signal line are not directly connected to the first constant potential line and the first clock signal line on the substrate.

23. The liquid crystal display device according to claim 21, further comprising:

a constant potential line and/or a clock signal line, the constant potential line connected to the first gate driver and the second gate driver, the clock signal line connected to the first gate driver and the second gate driver.

24. The liquid crystal display device according to claim 1, further comprising:

a start pulse line connected to the first gate driver, the start pulse line configured to start scanning of the plurality of first gate bus lines; and at least one signal line configured to connect the first gate driver and the second gate driver, wherein the scanning of the plurality of first gate bus lines is started based on a scanning start signal transmitted from the start pulse line to the first gate driver, and scanning of the plurality of second gate bus lines is started based on a signal transmitted from the at least one signal line to the second gate driver.

25. The liquid crystal display device according to claim 24, further comprising:

a constant potential line and a clock signal line, both of which are connected to the first gate driver and/or the second gate driver.

* * * * *